(12) United States Patent
Song et al.

(10) Patent No.: US 11,503,208 B2
(45) Date of Patent: Nov. 15, 2022

(54) INTELLIGENT ASSISTANT CONTROL METHOD AND TERMINAL DEVICE FOR RECOMMENDING A PHOTOGRAPHING MODE TO A USER

(71) Applicant: HUAWEI TECHNOLOGIES CO., LTD., Guangdong (CN)

(72) Inventors: Lei Song, Shanghai (CN); Xin Guo, London (GB); Xiaomeng Chen, Shenzhen (CN); Yunchao Zhang, Beijing (CN); Xin Chen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/041,696

(22) PCT Filed: Mar. 26, 2018

(86) PCT No.: PCT/CN2018/080555
§ 371 (c)(1),
(2) Date: Sep. 25, 2020

(87) PCT Pub. No.: WO2019/183775
PCT Pub. Date: Oct. 3, 2019

(65) Prior Publication Data
US 2021/0014420 A1 Jan. 14, 2021

(51) Int. Cl.
*H04N 5/232* (2006.01)
(52) U.S. Cl.
CPC ..... *H04N 5/23245* (2013.01); *H04N 5/23203* (2013.01); *H04N 5/23212* (2013.01); *H04N 5/23222* (2013.01); *H04N 5/23225* (2013.01)

(58) Field of Classification Search
CPC .......... H04N 5/23245; H04N 5/23203; H04N 5/23212; H04N 5/23222; H04N 5/23225;
(Continued)

(56) References Cited

U.S. PATENT DOCUMENTS

| 7,492,405 | B2 | 2/2009 | Shibutani |
| 8,126,321 | B2 * | 2/2012 | Nagao ................ H04N 5/23222 396/49 |

(Continued)

FOREIGN PATENT DOCUMENTS

| CN | 1936685 A | 3/2007 |
| CN | 101321223 A | 12/2008 |

(Continued)

*Primary Examiner* — Luong T Nguyen
(74) *Attorney, Agent, or Firm* — Womble Bond Dickinson (US) LLP

(57) ABSTRACT

An intelligent assistant control method is provided: starting, by a terminal device, a lens; displaying, by the terminal device, a preview interface on a display screen, where the preview interface includes a to-be-photographed object; and if the terminal device determines that the preview interface has been stably displayed for preset duration, displaying, by the terminal device, first prompt information of a photographing mode in the preview interface, where the first prompt information is used to recommend a first photographing mode to a user, and the first photographing mode is determined by the terminal device based on scene information of the to-be-photographed object.

20 Claims, 14 Drawing Sheets

(58) Field of Classification Search
CPC ......... H04N 5/232935; H04N 5/23229; H04N 5/23216; H04N 5/232933; H04N 5/232
See application file for complete search history.

(56) References Cited

U.S. PATENT DOCUMENTS

| | | | |
|---|---|---|---|
| 8,294,813 B2 | 10/2012 | Kawaguchi et al. | |
| 8,576,304 B2 | 11/2013 | Ishibashi | |
| 8,848,097 B2 | 9/2014 | Makii | |
| 8,928,761 B2 | 1/2015 | Yumiki | |
| 2005/0062875 A1 | 3/2005 | Ojima | |
| 2007/0065137 A1 | 3/2007 | Hara et al. | |
| 2007/0171282 A1 | 7/2007 | Yanagi | |
| 2008/0020795 A1 | 1/2008 | Kim | |
| 2009/0237548 A1 | 9/2009 | Watanabe et al. | |
| 2010/0277609 A1 | 11/2010 | Abe | |
| 2014/0240531 A1 | 8/2014 | Nakai et al. | |
| 2015/0189167 A1* | 7/2015 | Gwak | H04N 5/23222 348/222.1 |
| 2018/0198988 A1* | 7/2018 | Suo | H04N 1/00 |

FOREIGN PATENT DOCUMENTS

| | | | |
|---|---|---|---|
| CN | 101656831 A | | 2/2010 |
| CN | 102457673 | * | 5/2012 |
| CN | 102457673 A | | 5/2012 |
| CN | 103188423 A | | 7/2013 |
| CN | 103841324 A | | 6/2014 |
| CN | 104023174 A | | 9/2014 |
| CN | 103293825 B | | 11/2014 |
| CN | 104243822 A | | 12/2014 |
| CN | 104660908 | * | 5/2015 |
| CN | 104660908 A | | 5/2015 |
| CN | 104853092 A | | 8/2015 |
| CN | 106101536 A | | 11/2016 |
| CN | 107105165 A | | 8/2017 |
| CN | 107155060 A | | 9/2017 |
| CN | 107229625 A | | 10/2017 |
| CN | 104717366 B | | 11/2017 |
| CN | 107333004 A | | 11/2017 |
| CN | 107566529 A | | 1/2018 |
| EP | 1802096 A1 | | 6/2007 |
| EP | 3018892 A1 | | 5/2016 |
| JP | 2005348298 A | | 12/2005 |
| JP | 2007228118 A | | 9/2007 |
| JP | 2010252074 A | | 11/2010 |
| JP | 2012109866 A | | 6/2012 |
| JP | 2013157678 A | | 8/2013 |
| JP | 2014168173 A | | 9/2014 |
| JP | 2017138552 A | | 8/2017 |
| RU | 2549520 C2 | | 4/2015 |
| WO | 2017161902 A1 | | 9/2017 |

* cited by examiner

INTELLIGENT ASSISTANT CONTROL METHOD AND TERMINAL DEVICE FOR RECOMMENDING A PHOTOGRAPHING MODE TO A USER

CROSS-REFERENCE TO RELATED APPLICATIONS

This application is a national stage of International Patent Application No. PCT/CN2018/080555, filed on Mar. 26, 2018, which is hereby incorporated by reference in its entirety.

TECHNICAL FIELD

This application relates to the field of image photographing technologies, and in particular, to an intelligent assistant control method and a terminal device.

BACKGROUND

With continuous improvement of a photographing function of a mobile terminal in recent years, various "photographing modes" occur in the field of photographing technologies, to provide different photographing effects. However, a status of using a camera in a mobile terminal by a consumer is as follows: Because there are a large quantity of diversified "photographing modes", most consumers know little about the photographing modes of the camera, and cannot determine which photographing mode should be selected for a current scene to obtain an image with a better effect. Generally, a consumer manually selects a plurality of photographing modes. After trying several photographing modes, the user selects, from memory, a preferred photographing mode from the plurality of tried photographing modes for photographing. However, in this manner, the user needs to manually try a plurality of photographing modes, and the operation is cumbersome.

SUMMARY

This application provides an intelligent assistant control method and a terminal device, to recommend a photographing mode to a user, improve an image photographing effect, facilitate a user operation, and enhance user experience.

According to a first aspect, an embodiment of this application provides an intelligent assistant control method, and the method may be implemented by using a terminal device. The method includes: starting, by the terminal device, a lens; displaying, by the terminal device, a preview interface on a display screen, where the preview interface includes a to-be-photographed object; and displaying, by the terminal device, first prompt information of a photographing mode in the preview interface if the terminal device determines that the preview interface has been stably displayed for preset duration, where the first prompt information is used to recommend a first photographing mode to a user, and the first photographing mode is determined by the terminal device based on scene information of the to-be-photographed object.

In one embodiment, the terminal device recommends a proper photographing mode to the user only after determining that the preview interface is stably output. Therefore, the following case can be avoided: The first prompt information is constantly displayed in the preview interface and shields a part of the preview interface, preventing a user from better searching for a photographing angle. In addition, the following phenomenon can be avoided: The first prompt information is constantly displayed in the preview interface, and a scenario in which the first prompt information is switched in the preview interface in real time is presented to the user, easily arousing disgust in the user. According to the technical solution provided in this embodiment of this application, after determining that the preview interface is stably output, the terminal device considers that the user has determined a photographing angle, and then recommends an optimal photographing mode to the user. In this way, intelligence is improved, and user experience is enhanced.

In one embodiment, after the preview interface has been stably displayed for the preset duration, the terminal device identifies at least one type of scene information included in the to-be-photographed object. When the to-be-photographed object includes one type of scene information, the terminal device determines, based on the scene information and a first mapping relationship between scene information and a photographing mode, the first photographing mode corresponding to the scene information; or when the to-be-photographed object includes at least two types of scene information, the terminal device determines, based on the scene information and a first mapping relationship between scene information and a photographing mode, a photographing mode corresponding to each of the at least two types of scene information, to obtain at least two photographing modes, and the terminal device selects the first photographing mode from the at least two photographing modes according to a priority policy, where the priority policy includes priorities of the at least two photographing modes.

In one embodiment, after the preview interface is stably output, the terminal device may determine the photographing mode by identifying the scene information of the to-be-photographed object. In addition, when one or more types of scene information are identified, processing manners used by the terminal device are different. In this manner, accuracy of recommending a photographing mode is improved.

In one embodiment, before the preview interface has been stably displayed for the preset duration, the terminal device collects n frames of preview interfaces, where n is an integer greater than or equal to 1. The terminal device identifies at least one type of scene information of the to-be-photographed object included in each of the n frames of preview interfaces. The terminal device determines, based on the at least one type of scene information, a photographing mode matching each frame of preview interface. The outputting, by the terminal device, first prompt information if the preview interface has been stably displayed for preset duration includes: if the preview interface has been stably displayed for the preset duration, displaying, by the terminal device, the first prompt information in the preview interface, where the first prompt information is used to recommend the first photographing mode to the user, and the first photographing mode is a photographing mode matching the last frame of preview interface in the n frames of preview interfaces.

In one embodiment, before the preview interface has been stably displayed for the preset duration, the terminal device may collect a plurality of frames of preview interfaces in real time, and match each frame of preview interface with a proper photographing mode to obtain a plurality of photographing modes. After the preview interface has been stably displayed for the preset duration, the terminal device displays one of the plurality of photographing modes. According to the technical solution provided in this embodiment of this application, after determining that the preview interface is stably output, the terminal device considers that the user has determined a photographing angle, and then recommends an optimal photographing mode to the user. In this way, intelligence is improved, and user experience is enhanced.

In one embodiment, the determining, by the terminal device, whether the preview interface has been stably displayed for the preset duration includes: collecting, by the terminal device, at least two frames of preview interfaces within the preset duration; and if a similarity between the at least two frames of preview interfaces is higher than a preset similarity, determining that the preview interface has been stably displayed for the preset duration; or detecting, by the terminal device by using a motion sensor, whether the terminal device is in a still state within the preset duration; and if the terminal device is in a still state within the preset duration, determining that the preview interface has been stably displayed for the preset duration.

In one embodiment, the terminal device determines, in at least two manners, whether the preview interface is stably displayed. Manner 1 is determining whether the similarity between the at least two frames of preview interfaces collected within the preset duration is higher than the preset similarity. Manner 2 is determining whether the terminal device is in a still state within the preset duration. In these two manners, after determining that the preview interface is stably output, the terminal device considers that the user has determined a photographing angle, and then recommends an optimal photographing mode to the user. In this way, intelligence is improved, and user experience is enhanced.

In one embodiment, the first prompt information includes a first icon, the first icon is used to identify the first photographing mode, and the outputting, by the terminal device, first prompt information includes: displaying, by the terminal device, the first icon in a first display region in the preview interface, where the terminal device loads, in response to a first operation on the first icon, a parameter corresponding to the first photographing mode.

In one embodiment, the first prompt information is an icon corresponding to the recommended photographing mode. An icon display area may be usually set to be relatively small, to avoid shielding the preview interface. In addition, the user is relatively sensitive to the icon, and displaying the icon helps enhance user experience. The user may start the first photographing mode by triggering the icon, for example, tapping the icon, so that a user operation is facilitated.

In one embodiment, the terminal device displays the first parameter set in a second display region in the preview interface. The terminal device displays a modified second parameter set in response to a second operation, where the second parameter set is a parameter set obtained after a first parameter in the first parameter set is modified. The terminal device loads the second parameter set.

In one embodiment, after loading the parameter of the recommended photographing mode, the terminal device may display the parameter, and the user may modify a value of the parameter, thereby facilitating a user operation and enhancing user experience.

In one embodiment, if the first parameter is modified more than a preset quantity of times, the terminal device establishes a third mapping relationship between the second parameter set and the first photographing mode; and the terminal device adds the third mapping relationship to the second mapping relationship.

In one embodiment, the terminal device may record a quantity of times the user modifies the first parameter in the first parameter set. When the quantity of modification times is greater than the preset quantity of times, the terminal device establishes the third mapping relationship between the second parameter set and the first photographing mode. If the first photographing mode is recommended to the user next time, the second parameter set is used. In this manner, the terminal device may recommend an optimal photographing mode to the user based on a usage habit of the user, so that an image that relatively meets a requirement of the user can be photographed, thereby enhancing user experience.

In one embodiment, the terminal device displays first information in the preview interface in response to the second operation on the first icon, where the first information is text information describing the first photographing mode.

In one embodiment, if the user wants to know detailed content of the recommended photographing mode, the user may trigger, for example, double-tap, the icon of the photographing mode displayed in the preview interface, and the terminal device may display the detailed description of the recommended photographing mode, to help the user know the recommended photographing mode and enhance user experience.

In one embodiment, after the terminal device enters the first photographing mode, the terminal device displays second prompt information in the preview interface, where the second prompt information is used to remind the user that the terminal device is currently in the first photographing mode.

In one embodiment, after entering the recommended photographing mode, the terminal device may display the second prompt information, to remind the user that the terminal device has entered the photographing mode. This manner can help the user determine whether the recommended photographing mode is successfully enabled, thereby enhancing user experience.

In one embodiment, if the user selects another photographing mode other than the first photographing mode recommended by using the first prompt information, the terminal device determines whether a quantity of times the user selects the another photographing mode exceeds a preset quantity of times. When the quantity of times the user selects the another photographing mode exceeds the preset quantity of times, if there is only one type of scene information of the to-be-photographed scene, the terminal device updates the first mapping relationship by using a second mapping relationship between the another photographing mode and the scene information; or if there are at least two types of scene information of the to-be-photographed object, the terminal device sets a first priority of the another photographing mode to a second priority, where the second priority is greater than the first priority, and the terminal device updates the priority policy by using the second priority of the another photographing mode.

In one embodiment, the user may select the photographing mode recommended by the terminal device, or may select another photographing mode. If the user selects the another photographing mode, the terminal device may record a quantity of times the user selects the another photographing mode. After the quantity reaches a preset quantity of times, the terminal device updates a mapping relationship between a photographing mode and scene information, or updates the priority policy. In other words, the terminal device may record a usage habit of the user, and adjust a recommendation policy based on the usage habit of the user, thereby enhancing user experience.

According to a second aspect, an embodiment of this application provides a terminal device, including a processor and a memory. The memory is configured to store one or more computer programs. When the one or more computer programs stored in the memory are executed by the processor, the terminal device can implement the method according to any one of the first aspect and the possible designs of the first aspect.

According to a third aspect, an embodiment of this application further provides a terminal device, where the terminal device includes a module/unit for performing the method according to any one of the first aspect and the possible designs of the first aspect.

According to a fourth aspect, an embodiment of this application further provides a computer readable storage medium, where the computer readable storage medium includes a computer program, and when the computer program is run on a terminal device, the terminal device is enabled to perform the method according to any one of the first aspect and the possible designs of the first aspect.

According to a fifth aspect, an embodiment of this application further provides a computer program product. When the computer program product is run on a terminal device, the terminal device is enabled to perform the method according to any one of the first aspect and the possible designs of the first aspect.

DESCRIPTION OF EMBODIMENTS

The following describes the background related to this application.

With continuous improvement of a photographing function of a mobile terminal in recent years, various "photographing modes" occur in the field of photographing technologies, to provide different photographing effects. However, a status of using a camera in a mobile terminal by a consumer is as follows: Because there are a large quantity of diversified "photographing modes", most consumers know little about the photographing modes of the camera, and cannot determine which photographing mode should be selected for a current scene to obtain an image with a better effect. Generally, a consumer manually selects a plurality of photographing modes. After trying several photographing modes, the user selects, from memory, a preferred photographing mode from the plurality of tried photographing modes for photographing. However, in this manner, the user needs to manually try a plurality of photographing modes, and the operation is cumbersome.

Figure 1:
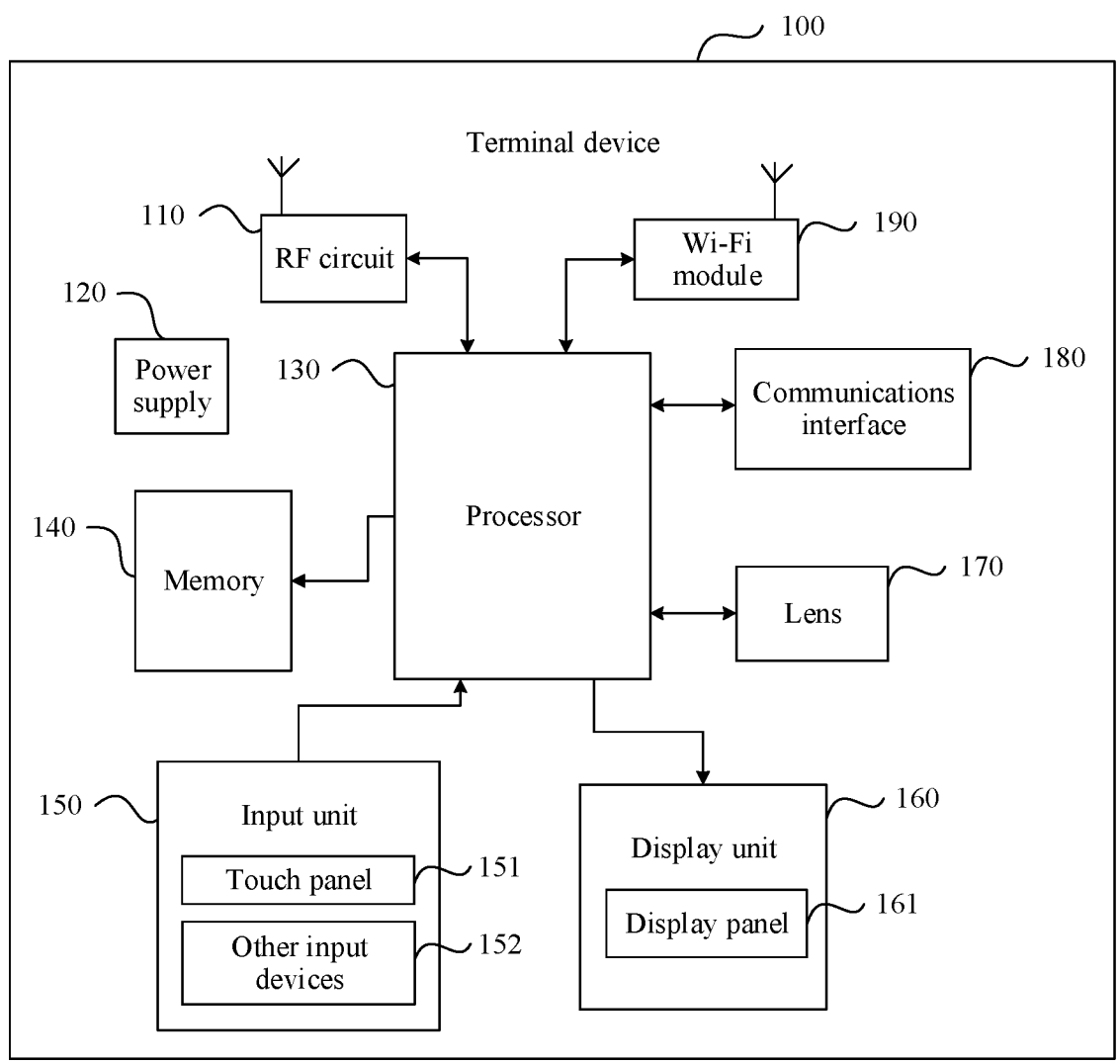
FIG. 1 is a schematic structural diagram of a terminal device according to an embodiment of the present invention.
Figure 2:
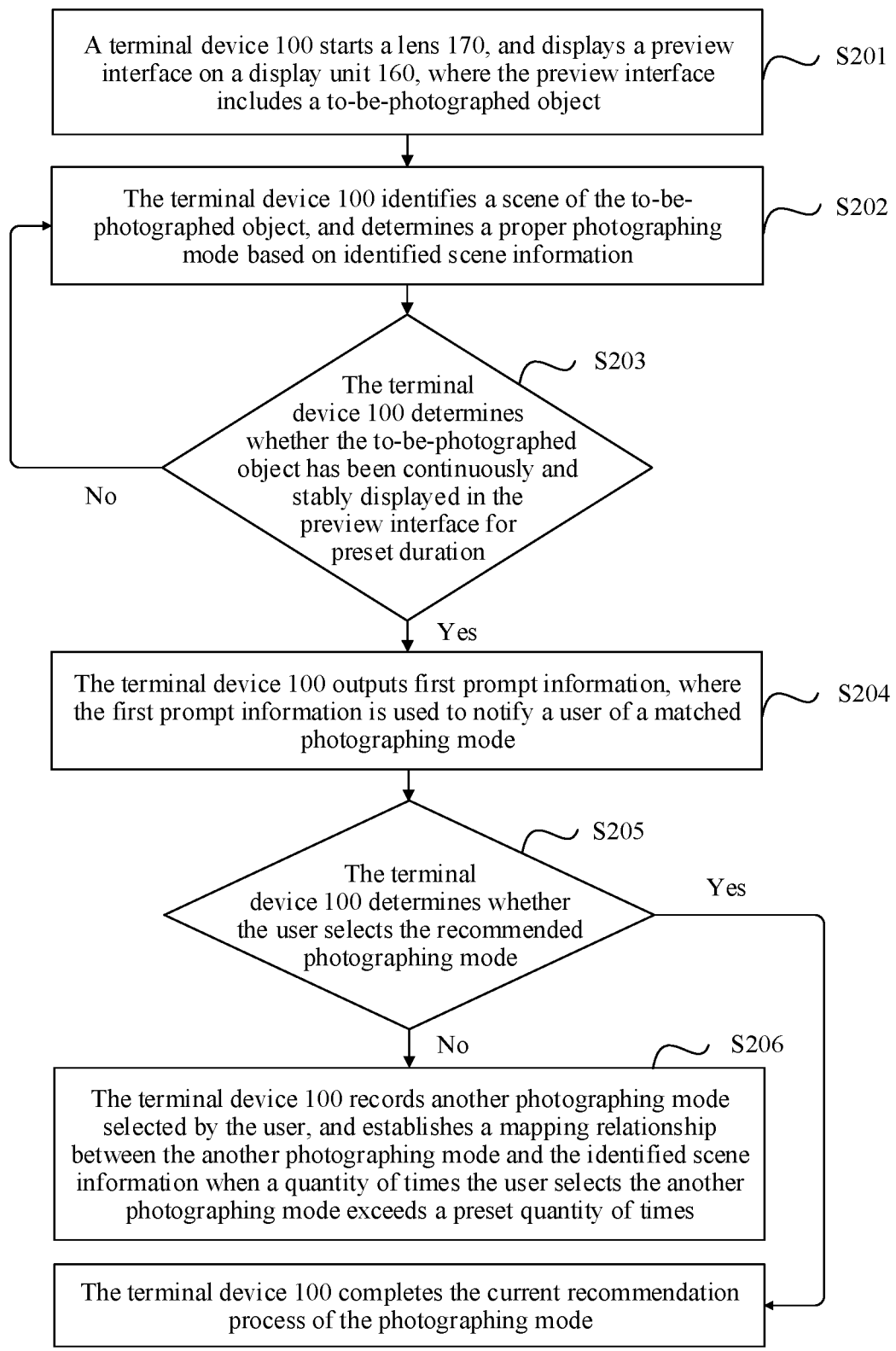
FIG. 2 is a flowchart of an intelligent assistant control method according to an embodiment of the present invention.

To resolve this technical problem, embodiments of this application provide an intelligent assistant control method and apparatus. In this method, a terminal device may identify a scene of a to-be-photographed object, determine a proper photographing mode based on identified scene information, and recommend the determined photographing mode to a user. The user does not need to manually perform selection from a large quantity of photographing modes, so that the operation is facilitated, and user experience is enhanced. The intelligent assistant control method provided in the embodiments of this application is applicable to a terminal device 100 shown in FIG. 1. Therefore, in the following description, the terminal device 100 is used as an example for description. For details, refer to FIG. 2. FIG. 2 is a flowchart of an intelligent assistant control method according to an embodiment of this application. As shown in FIG. 2, the method includes the following operations.

S201. The terminal device 100 starts a lens 170, and displays a preview interface on a display unit 160. The preview interface includes a to-be-photographed object.

In this embodiment of this application, a photographing apparatus may be an application (APP) with an image photographing function in the terminal device 100, for example, a camera included in the terminal device 100. Alternatively, the photographing apparatus may be a third-party application installed in the terminal device 100, for example, an application with an image photographing function, such as Sweet Camera, Photo Editor & Filters, Beauty Camera, WeChat, Alipay, Tencent chat software (QQ), DingTalk, photo sharing (e.g., Instagram), Kakao Talk, or Line.

The camera included in the terminal device 100 is used as an example. When a user needs to take a photograph, a camera icon displayed on the terminal device 100 may be triggered to start the camera. A processor 130 of the terminal device 100 runs the camera, starts the lens 170, and displays the preview interface on a display panel 161 of the display unit 160. When the user aligns the lens 170 with the to-be-photographed object, the to-be-photographed object is displayed in the preview interface.

S202. The terminal device 100 identifies a scene of the to-be-photographed object, and determines a proper photographing mode based on identified scene information. The scene information includes but is not limited to a character image scene, a landscape scene, a night scene, a green plant scene, a snow scene, and the like.

In one embodiment, when identifying the scene of the to-be-photographed object, the terminal device 100 may identify the to-be-photographed object, and may further identify the scene in which the to-be-photographed object is located. For example, the to-be-photographed object identified by the terminal device 100 includes food, a flower, a pet, and a transportation tool. The scene in which the to-be-photographed object is located and that is identified by the terminal device may include a mountain or a lake or a common urban facility: a cinema, a library, a hospital, a stadium, a station, or the like.

In one embodiment, the terminal device 100 may identify the scene of the to-be-photographed object by collecting the preview interface.

For example, after collecting the preview interface, the terminal device 100 may identify the scene information of the to-be-photographed object by identifying feature information in the collected preview interface. The feature information may be the to-be-photographed object, namely, a character, an animal, or a plant, included in the preview interface, or the feature information may be the scene in which the to-be-photographed object is located, for example, a building or natural scenery. For example, when the preview interface includes a character, the terminal device 100 determines that the scene information of the to-be-photographed object includes the character image scene. For example, when the preview interface includes a plant, a building, or natural scenery, the terminal device 100 determines that the scene information of the to-be-photographed object includes the landscape scene.

Further, to improve accuracy of scene identification, the terminal device 100 may refine different scenes. For example, the character image scene may fall into a common character image scene and a group image scene. The landscape scene may fall into a plant scene, a natural scenery scene, a sunrise/sunset scene, and the like. Each refined scene has a corresponding determining condition. Therefore, after identifying the feature information in the preview interface, the terminal device 100 may further determine whether the feature information meets a preset determining condition. If the feature information meets the preset determining condition, the terminal device 100 determines a scene corresponding to the determining condition.

For example, the feature information in the preview interface includes a character. The terminal device 100 may further determine whether a quantity of characters included in the preview interface is less than a preset quantity, or whether a proportion of an area occupied by characters in the preview interface to a total area of the preview interface is greater than a preset proportion. When the terminal device 100 determines that the quantity of characters is less than or equal to the preset quantity such as 2, and the proportion of the area occupied by the characters in the preview interface to the total area of the preview interface is less than the preset proportion such as 10%, the terminal device 100 determines that the scene information of the to-be-photographed object includes a common character image scene. When the terminal device 100 determines that the quantity of characters in the preview interface is greater than 2, the terminal device 100 determines that the scene information of the to-be-photographed object includes a group image scene.

For example, the feature information in the preview interface includes a flower or a green plant. The terminal device 100 may further determine a saturation value of the flower or the green plant in the preview interface. When the saturation value is greater than a preset value, the terminal device 100 determines that the scene information of the to-be-photographed object is a high-saturation plant scene.

In one embodiment, the terminal device 100 may further identify the scene information of the to-be-photographed object by determining a distance between the to-be-photographed object and the terminal device 100. When the distance between the to-be-photographed object and the terminal device 100 is less than or equal to a preset distance, the terminal device 100 determines that the scene information of the preview interface is a close shot scene.

In one embodiment, the terminal device 100 may identify the scene information of the to-be-photographed object in another manner. For example, the foregoing two manners are combined.

After identifying the scene information of the to-be-photographed object, the terminal device 100 may obtain, based on a mapping relationship between scene information and a photographing mode, the photographing mode matching the identified scene information. As an example, Table 1 lists a possible mapping relationship between scene information and a photographing mode.

TABLE 1

| Scene information | Photographing mode |
| --- | --- |
| Common character image scene | Character image mode |
| Group image scene | Group image mode |
| Landscape scene | Landscape mode |
| Close shot scene | Macro mode |
| Flower/Green plant scene | Vivid mode |

As shown in Table 1, after identifying the scene information of the to-be-photographed object, the terminal device 100 may determine, according to Table 1, the photographing mode corresponding to the identified scene information.

When the terminal device 100 identifies only one type of scene information of the to-be-photographed object, the terminal device 100 determines, according to Table 1, a photographing mode corresponding to the scene information.

When the terminal device 100 identifies a plurality of types of scene information of the to-be-photographed object, the terminal device 100 determines a plurality of photographing modes according to Table 1. The terminal device 100 may select a better photographing mode from the plurality of photographing modes based on a preset priority policy. The terminal device 100 may count a quantity of times or a frequency of using various photographing modes by the user, set a photographing mode frequently used by the user to be relatively high, and set a photographing mode infrequently used by the user to be relatively low. For example, the preset priority policy includes three priority policies, and there is a one-to-one correspondence between these three priority policies and identified scene types. For details, refer to Table 2.

TABLE 2

| Scene type | Priority policy |
| --- | --- |
| Close shot type | Micro mode, vivid mode |
| Object type | Character > Animal > Text > Food > Flower > Green plant > Autumn Leaf |

TABLE 2-continued

| Scene type | Priority policy |
| --- | --- |
| Scene type | Stage > Beach > Waterfall > Super night scene > Sunrise/Sunset > Blue sky > Snow scene |

There is also a priority policy for different types of scenes, for example, close shot type>object type>scene type.

In scenes of a same type, different photographing modes are applicable to different environment conditions. For example, for the close shot type, the vivid mode is relatively suitable for an environment with relatively strong light, and the macro mode is relatively suitable for an environment with relatively weak light. Therefore, the terminal device 100 may determine a proper photographing mode based on different environment conditions. For example, if light intensity of an environment is greater than preset intensity, the vivid mode is selected; or if light intensity is less than preset intensity, the macro mode is selected.

After identifying that the to-be-photographed object has a plurality of scenes, the terminal device 100 may determine a type of each scene. Specifically, the terminal device 100 may determine the type of the scene based on a type of the feature information in the preview interface, or may determine the type of the scene based on the distance between the terminal device 100 and the to-be-photographed object.

For example, the terminal device 100 determines that the preview interface includes three types of feature information, namely, a character, a dog, and a snow scene. The terminal device 100 determines three photographing modes, namely, the character image mode, an animal mode, and the landscape mode, according to Table 1. The terminal device 100 determines a type of each type of feature information. To be specific, the character and the dog belong to the object type, and the snow scene belongs to the scene type. The terminal device 100 determines that a priority of the object type is higher than a priority of the scene type, and determines, according to Table 2, that a priority of the character in the object type is higher than a priority of the animal. Therefore, the terminal device 100 may determine that a better photographing mode in the three photographing modes is the character image mode.

In one embodiment, the photographing mode may be understood as a set of parameters that are set when the terminal device 100 photographs the to-be-photographed object. The set may include an aperture, a shutter, ISO, white balance, and the like. In one photographing mode, a proper value is set for each parameter in a parameter set. In a possible case, a manufacturer of the terminal device 100 stores a set of preset parameters and a value of each parameter in the terminal device 100 based on some typical scenes such a night scene, a character image, a snow scene, and a beach. For example, the manufacturer may obtain the set of preset parameters and the value of each parameter through an experiment, or may obtain the set of preset parameters and the value of each parameter in another manner. The user may also manually adjust a value of a parameter in a photographing mode. For example, in the character image mode, a default value of an aperture is a first value. The user may also adjust the aperture, and a value of the adjusted aperture is a second value. In the terminal device 100, the value of the aperture in the character image mode may be set to the second value.

S203. The terminal device 100 determines whether the to-be-photographed object has been continuously and stably displayed in the preview interface for preset duration. If yes, S204 is performed; or if no, S202 is performed.

Generally, the to-be-photographed object in the preview interface changes dynamically. For example, after starting the photographing apparatus in the terminal device 100, the user usually searches for an optimal photographing angle, photographing range, and the like. In the search process, the to-be-photographed object in the preview interface changes in real time. When determining that the to-be-photographed object in the preview interface is unstably displayed, the terminal device 100 considers that the user is currently searching for a photographing angle, and the terminal device 100 may perform S202. The terminal device 100 may identify the scene of the to-be-photographed object in real time, and determine the proper photographing mode based on the identified scene information. Specifically, the terminal device 100 can collect the preview interface in real time, and then identify the scene information of the to-be-photographed object by identifying the feature information in the collected preview interface (refer to the description of S202).

Figure 3:
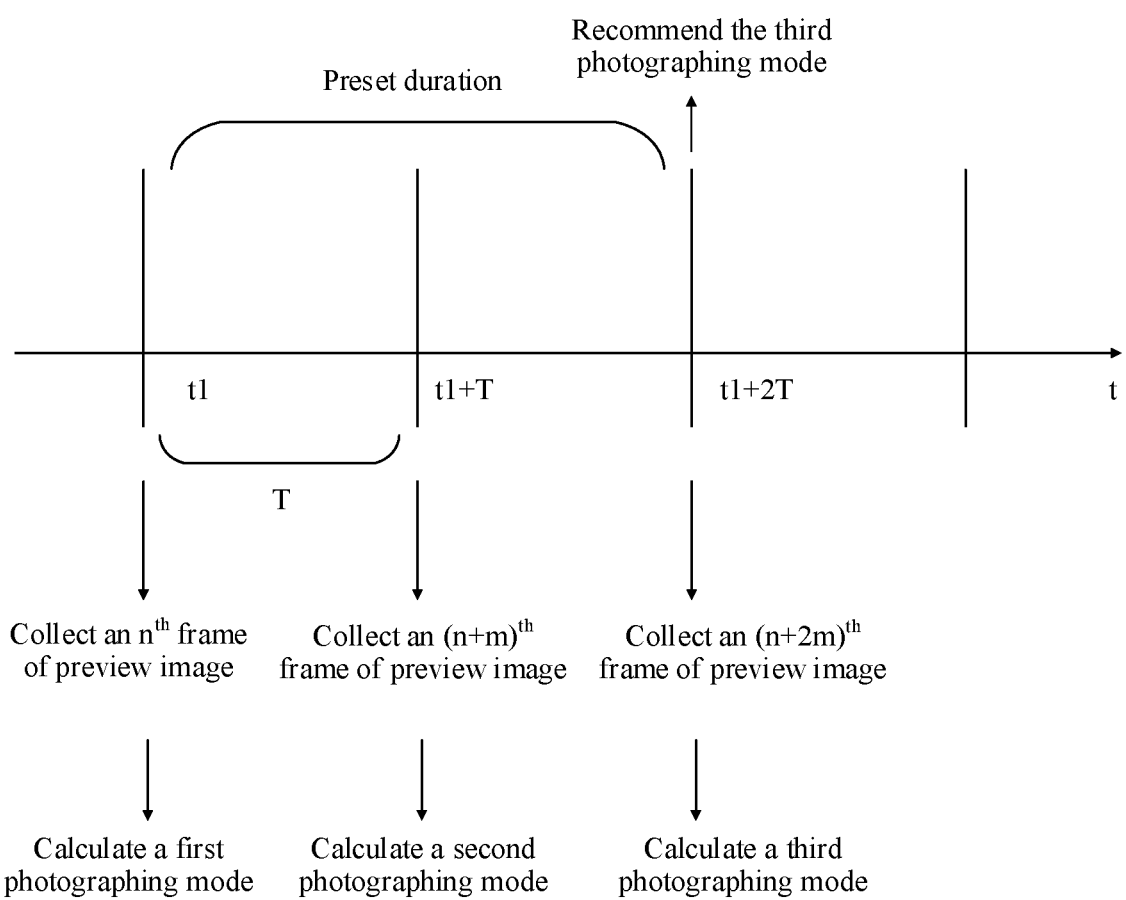
FIG. 3 is a schematic diagram of periodically collecting a preview interface by a terminal device according to an embodiment of the present invention.

For ease of understanding by a person skilled in the art, refer to FIG. 3. FIG. 3 is a schematic diagram of periodically collecting a preview interface by a terminal device.

In FIG. 3, a cycle of collecting the preview interface by the terminal device 100 is T. The terminal device 100 collects an $n^{th}$ frame of preview interface at a moment t1, then identifies scene information of the to-be-photographed object by identifying feature information in the $n^{th}$ frame of preview interface, and determines that a photographing mode corresponding to the identified scene information is a first photographing mode. The terminal device 100 collects an $(n+m)^{th}$ frame of preview interface at a moment t1+T, then identifies scene information of the to-be-photographed object by identifying feature information in the $(n+m)^{th}$ frame of preview interface, and determines that a photographing mode corresponding to the identified scene information is a second photographing mode. The terminal device 100 collects an $(n+2m)^{th}$ frame of preview interface at a moment t1+2T, then identifies scene information of the to-be-photographed object by identifying feature information in the $(n+2m)^{th}$ frame of preview interface, and determines that a photographing mode corresponding to the identified scene information is a third photographing mode.

In FIG. 3, the preset duration is greater than T. In a possible implementation, the terminal device 100 determines a similarity between the $n^{th}$ frame of preview interface, an $(n+1)^{th}$ frame of preview interface, and an $(n+2)^{th}$ frame of preview interface through comparison. If the similarity is higher than a preset similarity, it is considered that the current preview interface is stably displayed. In this case, the terminal device 100 outputs first prompt information. Because the preview interface has been stably displayed for the preset duration, there is a relatively large possibility that the first photographing mode, the second photographing mode, and the third photographing mode are the same. Therefore, the first prompt information output by the terminal device 100 may be used to recommend any one of the three photographing modes. Certainly, preferably, the terminal device 100 may recommend the finally determined photographing mode, namely, the third photographing mode. In FIG. 3, the preset duration is greater than the cycle of collecting the preview interface, only for ease of understanding by the reader. In an actual application, a person skilled in the art may set, based on an actual requirement, a relationship between the preset duration and the cycle of collecting the preview interface.

In another embodiment, the terminal device 100 detects, by using a motion sensor in the terminal device 100, that the terminal device 100 is in a still state within the preset duration. In this case, the terminal device 100 determines that the preview interface is stably displayed. The terminal device 100 may output first prompt information. Likewise, because the preview interface has been stably displayed for the preset duration, there is a relatively large possibility that the first photographing mode, the second photographing mode, and the third photographing mode are the same. Therefore, the first prompt information output by the terminal device 100 may be used to recommend any one of the three photographing modes. Certainly, preferably, the terminal device 100 may recommend the finally determined photographing mode, namely, the third photographing mode.

In one embodiment, the motion sensor in the terminal device 100 may be a speed sensor, an acceleration sensor, an angular velocity sensor, a gyroscope, or the like.

After determining that the preview interface has been stably displayed for the preset duration, the terminal device 100 considers that the user completes the process of searching for a photographing angle, in other words, the to-be-photographed object displayed in the current preview interface is a scene that the user expects to photograph. The terminal device 100 may output first prompt information. The first prompt information is used to recommend a better photographing mode obtained by the terminal device 100 through matching to the user.

In one embodiment, after the terminal device 100 continuously and stably displays the preview interface, for example, the terminal device 100 has been still for the preset duration, a new object may enter a photographing range. To be specific, a new object may occur in the preview interface (the new object enters a photographing range), in other words, the to-be-photographed object in the preview interface changes. Therefore, after continuously and stably displaying the preview interface, the terminal device 100 may also identify scene information of the to-be-photographed object in real time, and recommend a proper photographing mode to the user.

Figure 4A:
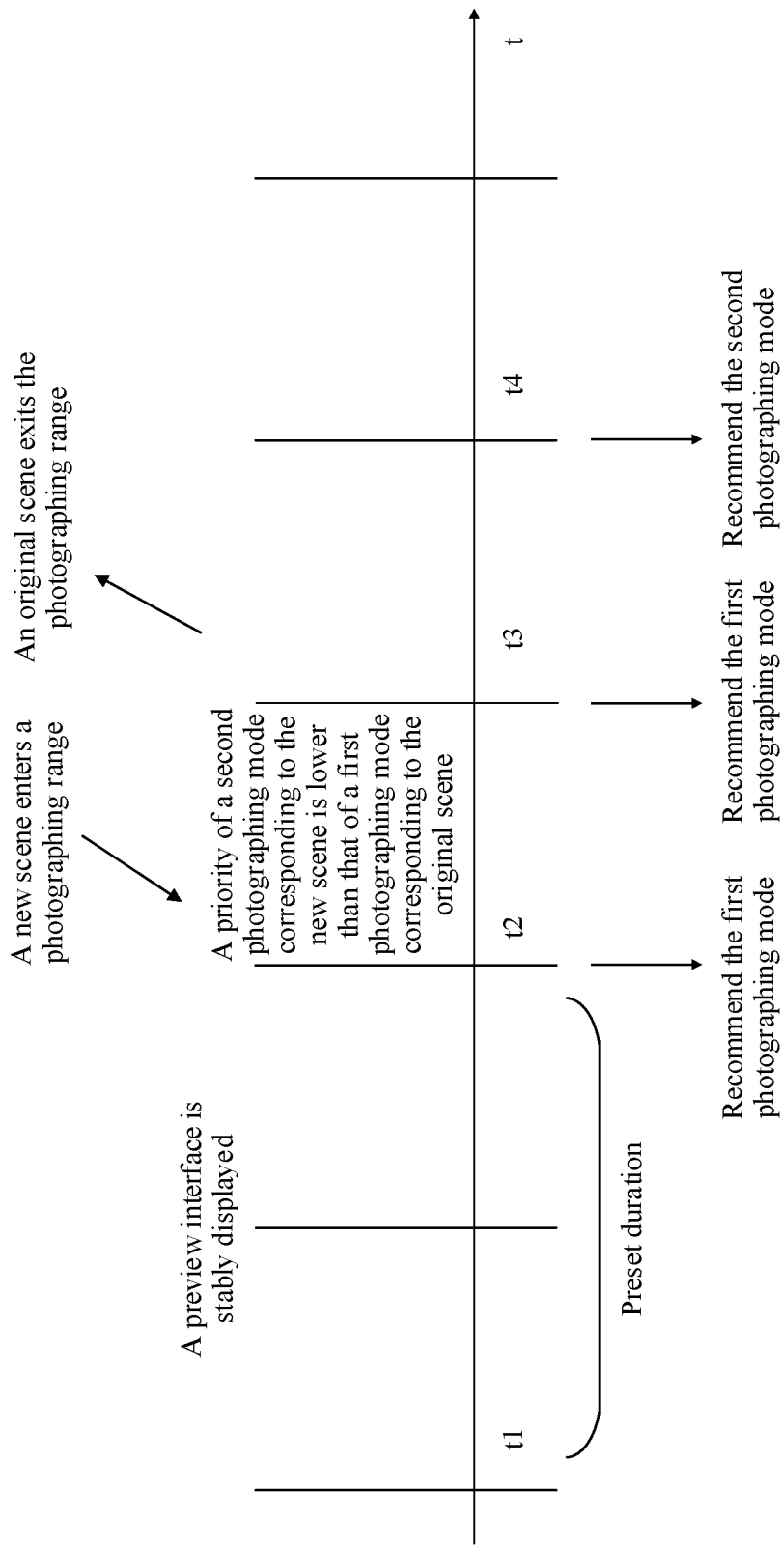
FIG. 4A is a schematic diagram of time nodes of recommending photographing modes by a terminal device according to an embodiment of the present invention.
Figure 4B:
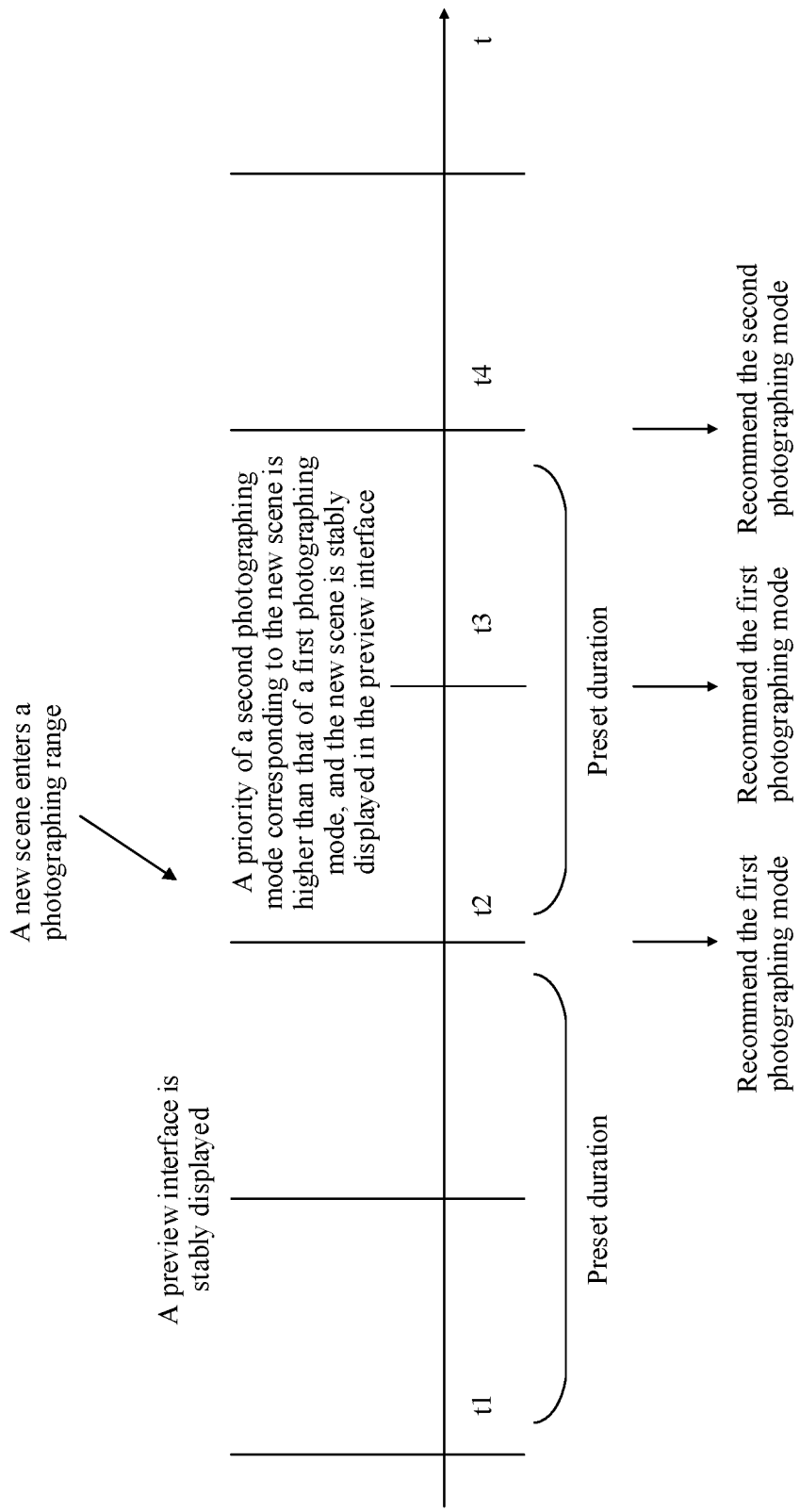
FIG. 4B is a schematic diagram of time nodes of recommending photographing modes by a terminal device according to an embodiment of the present invention.

For example, FIG. 4A and FIG. 4B are schematic diagrams in which a new object enters a photographing range after a preview interface of a terminal device is stably output.

In FIG. 4A, if the terminal device 100 determines that the preview interface has been stably displayed for the preset duration at a moment t2, the terminal device 100 detects that the terminal device 100 recommends a first photographing mode to the user at the moment t2. If a new object enters the photographing range at the moment t2 (or another moment, where in FIG. 4A, a moment between t2 and t3 is used as an example), in other words, the to-be-photographed object in the preview interface changes, the terminal device 100 may perform scene identification on the new to-be-photographed object. If a priority of a second photographing mode corresponding to the new object is lower than that of the first photographing mode, the terminal device 100 continues to recommend the first photographing mode to the user, for example, at the moment t3 in FIG. 4A.

For example, at the moment t2, the preview interface displayed on the terminal device 100 includes a character and a snow scene, and the preview interface has been stably displayed for the preset duration. In this case, the terminal device 100 recommends the character image mode to the user according to the priority policy. If the user does not trigger a photographing control, and a dog enters the photographing range, in other words, the companion of the user, the dog, and the snow scene are displayed in the preview interface, when detecting that the to-be-photographed object changes, the terminal device 100 may continue to identify a scene of the to-be-photographed object. After the identification, new scene information includes a character image scene, an animal scene, and a snow scene. The terminal device 100 determines, according to the priority policy, that a priority of the character image mode is higher than that of the animal mode and that of a snow scene mode. Therefore, at the moment t3, the terminal device 100 continues to recommend the character image mode to the user. In this manner, because the terminal device 100 has determined that the priority of the animal mode is lower than that of the character image mode, the terminal device 100 does not need to detect whether the dog has been stably displayed in the preview interface for the preset duration, so that computing resources are reduced.

Further referring to FIG. 4A, after the new object enters the photographing range, if the original scene exits the photographing range, for example, at a moment between t3 and t4 in FIG. 4A, the original scene exits the photographing range, the terminal device 100 determines whether the new object has been stably displayed in the preview interface for the preset duration. If yes, the terminal device 100 recommends the second photographing mode corresponding to the new object to the user, for example, at the moment t4 in FIG. 4A.

The foregoing example in which the user photographs the companion by using the terminal device 100 is still used for description. If the companion of the user walks out of the photographing range, in other words, only the dog and the snow scene fall within the photographing range, the terminal device 100 identifies that the scene information includes the animal scene and the snow scene. It can be learned from the priority policy that the priority of the animal mode is higher than that of the snow scene mode. Therefore, if a preview interface including the dog and the snow scene has been stably displayed for the preset duration, the terminal device 100 recommends the animal mode to the user.

In FIG. 4B, if the terminal device 100 determines that the preview interface has been stably displayed for the preset duration at a moment t2, the terminal device 100 recommends a first photographing mode to the user. If a new object enters the photographing range at the moment t2 (or another moment, where in FIG. 4A, a moment between t2 and t3 is used as an example), in other words, the to-be-photographed object in the preview interface changes, the terminal device 100 may perform scene identification on the new to-be-photographed object. If a priority of a second photographing mode corresponding to the new object is higher than that of the first photographing mode, but the new object has been in the preview interface for a relatively short time, in other words, the new object has not been stably displayed in the preview interface for the preset duration, the terminal device 100 still recommends the first photographing mode to the user, for example, at the moment t3 in FIG. 4B. If a priority of the second photographing mode corresponding to the new object is higher than that of the first photographing mode, and the new object has been stably displayed in the preview interface for the preset duration, the terminal device 100 recommends the second photographing mode to the user at a moment t4, for example, at the moment t4 in FIG. 4B.

For example, if at the moment t2, the preview interface displayed by the terminal device 100 includes a dog and a snow scene, and the preview interface has been stably displayed for the preset duration, the terminal device 100 recommends the first photographing mode, namely, the animal mode, to the user according to the priority policy. If at a moment during t2 and t3, a character enters the photographing range, in other words, the character occurs in the preview interface, because the to-be-photographed object changes, the terminal device 100 continues to identify a new to-be-photographed object. After the identification, the terminal device 100 determines that the new to-be-photographed object includes a human image scene, an animal scene, and a snow scene. The terminal device 100 determines, according to the priority policy, that the character image mode has the highest priority, and the animal scene has the second highest priority. Therefore, if the character has been in the preview interface for a relatively short time that is less than the preset duration, the terminal device 100 continues to recommend the animal mode to the user. If the character has been stably displayed in the preview interface for the preset duration, the terminal device 100 recommends the character image mode to the user. Afterward, if the character exits the photographing range, in other words, only the dog and the snow scene are left in the preview interface, the terminal device 100 determines whether the dog and the snow scene have been stably displayed in the preview interface for the preset duration. If yes, the terminal device 100 continues to recommend the animal mode to the user according to the priority policy.

Therefore, in one embodiment of this application, the terminal device recommends a proper photographing mode to the user after determining that the preview interface has been stably displayed for the preset duration. However, because the to-be-photographed object in the preview interface may change, the terminal device may further perform scene recognition on a new to-be-photographed object in real time. If the new to-be-photographed object includes a plurality of scenes, the terminal device may re-determine an optimal photographing mode according to the priority policy. If the new to-be-photographed object has been stably displayed in the preview interface for the preset duration, the terminal device recommends the determined photographing mode to the user.

Generally, when the user photographs a scene by using a mobile phone, a preview interface changes in real time in a process in which the user searches for a photographing angle. In the process in which the preview interface changes, first prompt information is constantly displayed in the preview interface, and the first prompt information usually shields a part of the preview interface. Therefore, the user is prevented from better searching for a photographing angle, and user experience is reduced. In addition, it can be learned from the foregoing content that when preview interfaces are different, determined photographing modes may be different, in other words, first prompt information may be different. If the first prompt information is constantly displayed in the preview interface, a scenario in which the first prompt information is switched in the preview interface in real time is presented to the user, easily arousing disgust in the user. According to the technical solution provided in this embodiment of this application, the terminal device 100 displays the first prompt information only after determining that the preview interface has been stably displayed for the preset duration. In other words, after considering that the user has determined a photographing angle, the terminal device 100 recommends an optimal photographing mode to the user, so that no prompt information occurs frequently and interferes with a normal photographing activity of the user, and prompt information matching a mode can also be provided in a timely manner. In this way, the user can perform optimized photographing based on the prompt information to obtain a better photographing result. Therefore, in this solution, intelligence of human-machine interaction can be improved, and quality of an output image can be improved.

S204. The terminal device 100 outputs first prompt information, where the first prompt information is used to notify the user of a matched photographing mode.

In this embodiment of this application, after determining an optimal photographing mode, the terminal device 100 outputs the first prompt information. The first prompt information is used to recommend the matched photographing mode to the user.

For example, the terminal device 100 may display the first prompt information in the preview interface. The first prompt information may be in a text form, an image form, an icon form, or the like. Certainly, the first prompt information may be audio information.

S205. The terminal device 100 determines whether the user selects the recommended photographing mode. If no, S206 is performed; or if yes, the current recommendation process of the photographing mode is completed.

After the terminal device 100 outputs the first prompt information, the user may select the photographing mode recommended by using the first prompt information, or may select another photographing mode.

S206. The terminal device 100 records another photographing mode selected by the user, and establishes a mapping relationship between the another photographing mode and the identified scene information when a quantity of times the user selects the another photographing mode exceeds a preset quantity of times.

It can be learned from the foregoing content that the terminal device 100 may identify one or more types of scene information of the to-be-photographed object. When there is only one type of scene information, the terminal device 100 determines, according to Table 1, a photographing mode corresponding to the scene information, and then recommends the determined photographing mode to the user. If the user does not use the recommended photographing mode, but selects another photographing mode, in this scene, when a quantity of times the user selects the another photographing mode exceeds a preset quantity of times, the terminal device 100 establishes a mapping relationship between the scene information and the another photographing mode, and updates Table 1 based on the mapping relationship. When it is identified next time that the to-be-photographed object includes the scene, the terminal device 100 recommends the another photographing mode to the user.

When there are a plurality of types of scene information, the terminal device selects a better photographing mode from the plurality of photographing modes according to the priority policy, and recommends the selected photographing mode to the user. If the user does not use the recommended photographing mode, but selects another photographing mode, the terminal device 100 may keep a record. For example, the terminal device 100 may count a quantity of times the user selects the another photographing mode. After the counted quantity exceeds a preset quantity of times, the terminal device 100 considers that the user prefers the another photographing mode in this scene. In this case, the terminal device 100 increases a priority of the another photographing mode, and updates Table 2.

The example in which the to-be-photographed object includes a character, a dog, and a snow scene is still used. The terminal device 100 recommends the character image mode to the user according to the priority policy. If the user selects the snow scene mode, the terminal device 100 may record that the user selects the snow scene mode once when the to-be-photographed object includes a snow scene. A higher quantity of times the user selects the snow scene mode indicates that the snow scene mode has a higher priority. The terminal device 100 may update Table 2, to be specific, increase the priority of the snow scene mode. For example, the priority of the snow scene mode is higher than that of the blue sky mode, and even a priority of the scene type is higher than that of the animal mode. When it is identified next time that a to-be-photographed object includes a character, a dog, and a snow scene, the terminal device 100 recommends the snow scene mode to the user according to the new priority policy.

In one embodiment, the terminal device 100 may record a usage habit of the user, and recommend a photographing mode that meets the usage habit of the user to the user, so that user experience is enhanced.

Figure 5:
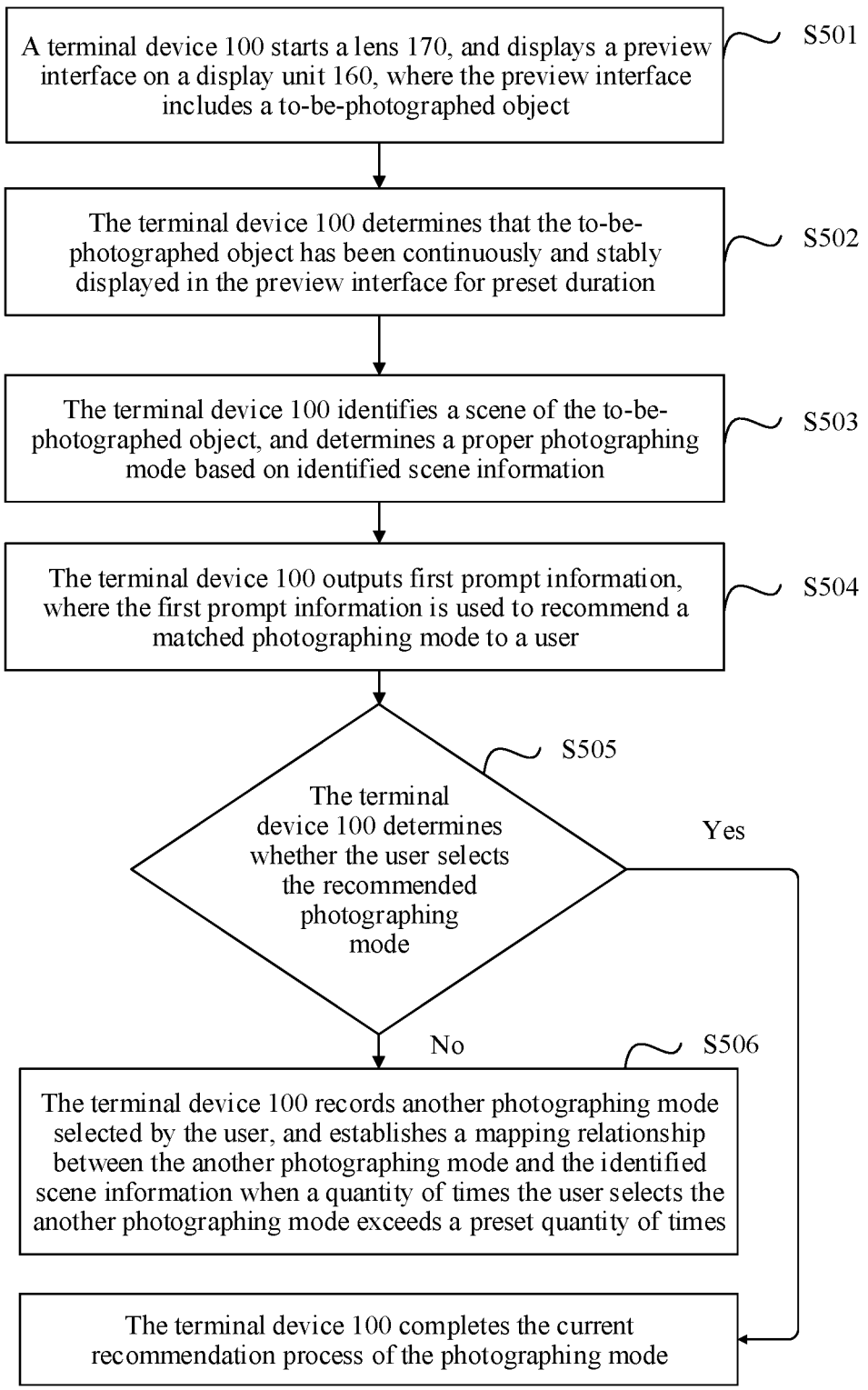
FIG. 5 is a flowchart of another intelligent assistant control method according to an embodiment of the present invention.

In the embodiment shown in FIG. 2, the terminal device 100 identifies the scene information of the to-be-photographed object in real time, and determines the photographing mode matching the identified scene information. After detecting that the preview interface has been stably displayed for the preset duration, the terminal device 100 recommends the matched photographing mode to the user. On the basis of the foregoing embodiment shown in FIG. 2, in another possible implementation of the embodiments of this application, the terminal device 100 may identify the scene information of the to-be-photographed object only after determining that the preview interface has been stably displayed for the preset duration, and determine the photographing mode matching the identified scene information. Then the terminal device 100 recommends the determined photographing mode to the user. For details, refer to FIG. 5. FIG. 5 is a flowchart of another intelligent assistant control method according to an embodiment of this application.

S501. A terminal device 100 starts a lens 170, and displays a preview interface on a display unit 160. The preview interface includes a to-be-photographed object.

For description of the S501, refer to the description of S201 in the embodiment shown in FIG. 2. For brevity of this specification, details are not described herein again.

S502. The terminal device 100 determines that the to-be-photographed object in the preview interface has been continuously and stably displayed for preset duration.

In one embodiment, referring to FIG. 3, terminal device 100 may collect three frames of preview interfaces within the preset duration. If a similarity between the three frames of preview interfaces is higher than a preset similarity, it is considered that the preview interface is stably displayed. The terminal device 100 may select one frame of preview interface from the three frames of preview interfaces, for example, select a collected last frame of preview interface, namely, an $(n+2)^{th}$ frame of preview interface. Then the terminal device 100 identifies scene information of the to-be-photographed object by identifying feature information in the selected $(n+2)^{th}$ frame of preview interface.

Figure 6:
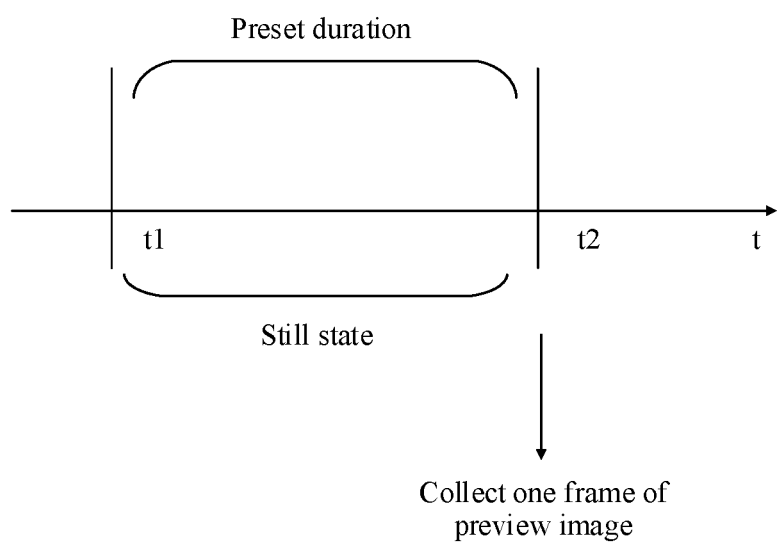
FIG. 6 is a schematic diagram of periodically collecting a preview interface by a terminal device according to an embodiment of the present invention.

In one embodiment, referring to FIG. 6, terminal device 100 detects, by using a motion sensor in the terminal device 100, that the terminal device 100 is in a still state within the preset duration. In this case, the terminal device 100 considers that the preview interface is stably displayed. The terminal device 100 may collect one or more frames of preview interfaces at a moment t2. Then the terminal device 100 identifies the scene information of the to-be-photographed object by using feature information in the collected preview interface. Specifically, if the terminal device 100 collects a frame of preview interface at the moment t2, the terminal device 100 identifies the scene information of the to-be-photographed object by using feature information in the preview interface. If the terminal device 100 collects a plurality of preview interfaces at the moment t2, the terminal device 100 may select a frame of preview interface with a better effect from the plurality of preview interfaces, for example, may select a frame of preview interface with relatively high definition from the plurality of preview interfaces. Then the terminal device 100 identifies the scene information of the to-be-photographed object by using feature information in the selected preview interface.

In this manner, the terminal device 100 does not need to collect the preview interface in real time. The terminal device 100 collects the preview interface only after determining that the preview interface is stably displayed. Then the terminal device 100 identifies the scene information of the to-be-photographed object by using the feature information in the collected preview interface, and further determines a proper photographing mode based on the scene information. In this manner, memory resources are reduced, computing resources and a computing time are reduced, and efficiency is improved.

S503. The terminal device 100 identifies a scene of the to-be-photographed object, and determines a proper photographing mode based on the identified scene information. The scene information includes but is not limited to a character image scene, a landscape scene, a night scene, a green plant scene, a snow scene, and the like.

In one embodiment, after determining that the preview interface has been continuously and stably displayed for the preset duration, the terminal device 100 considers that a user completes a process of searching for a photographing angle, in other words, the to-be-photographed object displayed in the current preview interface is a scene that the user expects to photograph. Therefore, the terminal device 100 identifies the scene information of the to-be-photographed object, and determines the proper photographing mode based on the identified scene information. For details, refer to the description of S202 in the embodiment shown in FIG. 2.

In this manner, the terminal device 100 does not need to perform scene identification on the to-be-photographed object in real time. Only after determining that the preview interface is stable, the terminal device 100 performs processes of performing scene identification and determining a photographing mode, so that computing resources and a computing time are reduced, and computing efficiency is improved. In S503, a manner in which the terminal device 100 determines the proper photographing mode based on the identified scene information is similar to that in S202 in the embodiment shown in FIG. 2. For brevity of this specification, details are not described herein again.

S504. The terminal device 100 outputs first prompt information, where the first prompt information is used to recommend a matched photographing mode to the user.

S505. The terminal device 100 determines whether the user selects the recommended photographing mode. If no, S506 is performed; or if yes, the current recommendation process of the photographing mode is completed.

S506. The terminal device 100 records another photographing mode selected by the user, and establishes a mapping relationship between the another photographing mode and the identified scene information when a quantity of times the user selects the another photographing mode exceeds a preset quantity of times.

For description of S504 to S506, refer to the description of S204 to S206 in the embodiment shown in FIG. 2. For brevity of this specification, details are not described herein again.

For example, FIG. 7A to FIG. 7E are schematic diagrams of a display status of a display screen when a terminal device photographs an image. In FIG. 7A to FIG. 7E, for example, the terminal device is a mobile phone.

Figure 7A:
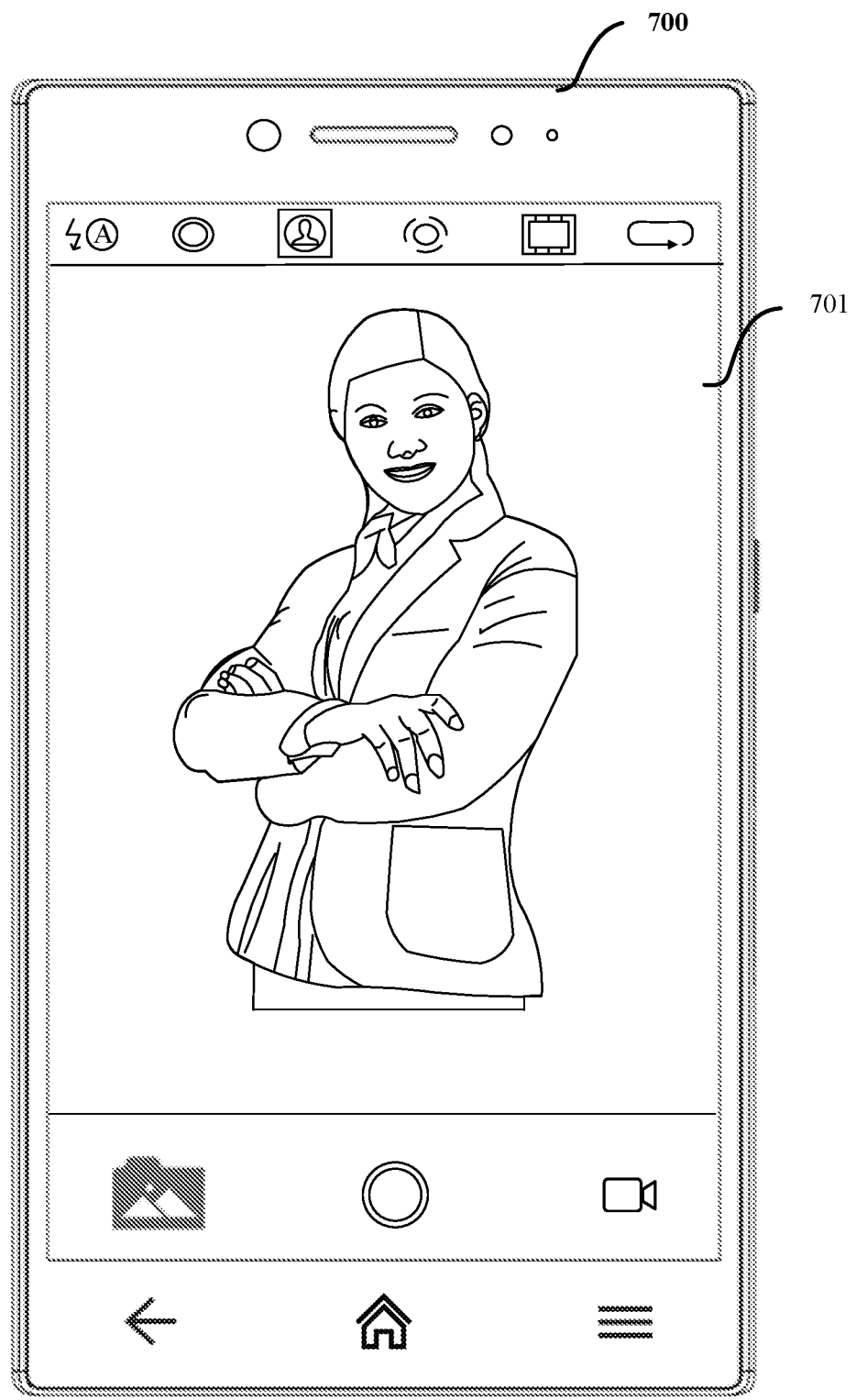
FIG. 7A is a schematic diagram of a display status of a display screen when a terminal device photographs an image according to an embodiment of the present invention.

In FIG. 7A, a user starts a camera in the mobile phone 700 and starts a lens. The user aligns the started lens with Alice for photographing. An image of Alice is displayed in a preview interface 701 of the camera. The mobile phone 700 determines that scene information is a character image scene, and determines that a photographing mode corresponding to the character image scene is a character image mode. For outputting first prompt information by the mobile phone 700, refer to FIG. 7B.

Figure 7B:
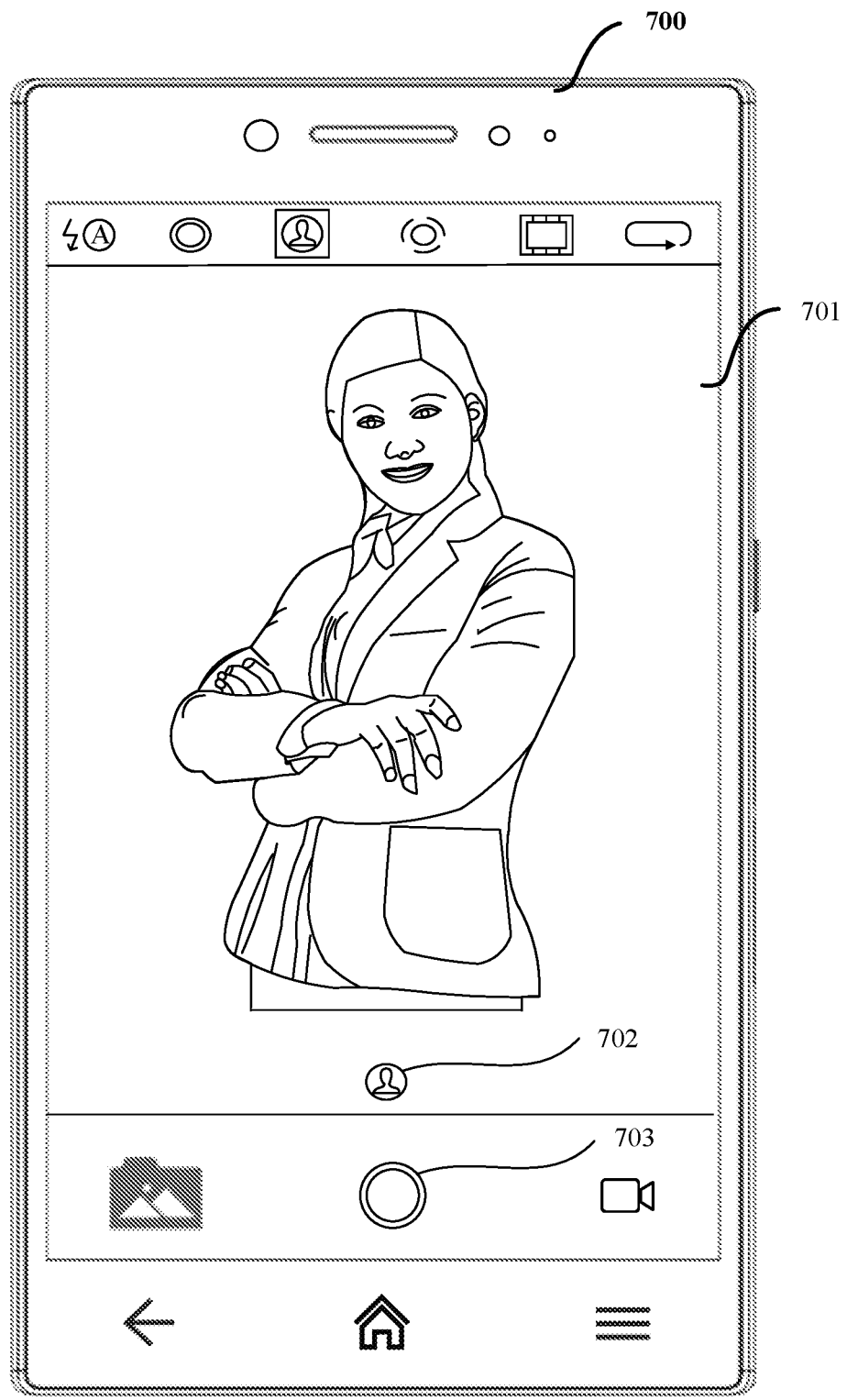
FIG. 7B is a schematic diagram of a display status of a display screen when a terminal device photographs an image according to an embodiment of the present invention.

In FIG. 7B, the mobile phone 700 displays the first prompt information in the preview interface 701, and the first prompt information is displayed in a form of an icon 702. The icon 702 may be an image corresponding to the recommended photographing mode. Because the recommended photographing mode is the character image mode, the displayed icon 702 is an icon of the character image mode. Certainly, in addition to the form of the icon 702, the first prompt information may be displayed in another form such as a text or an image.

In one embodiment, a display location of the first prompt information in the preview interface 701 is not specifically limited in this embodiment of this application. For example, the first prompt information may be displayed near a photographing control 703, so that the user can easily observe the first prompt information, and the user can perform an operation on the first prompt information.

Figure 7C:
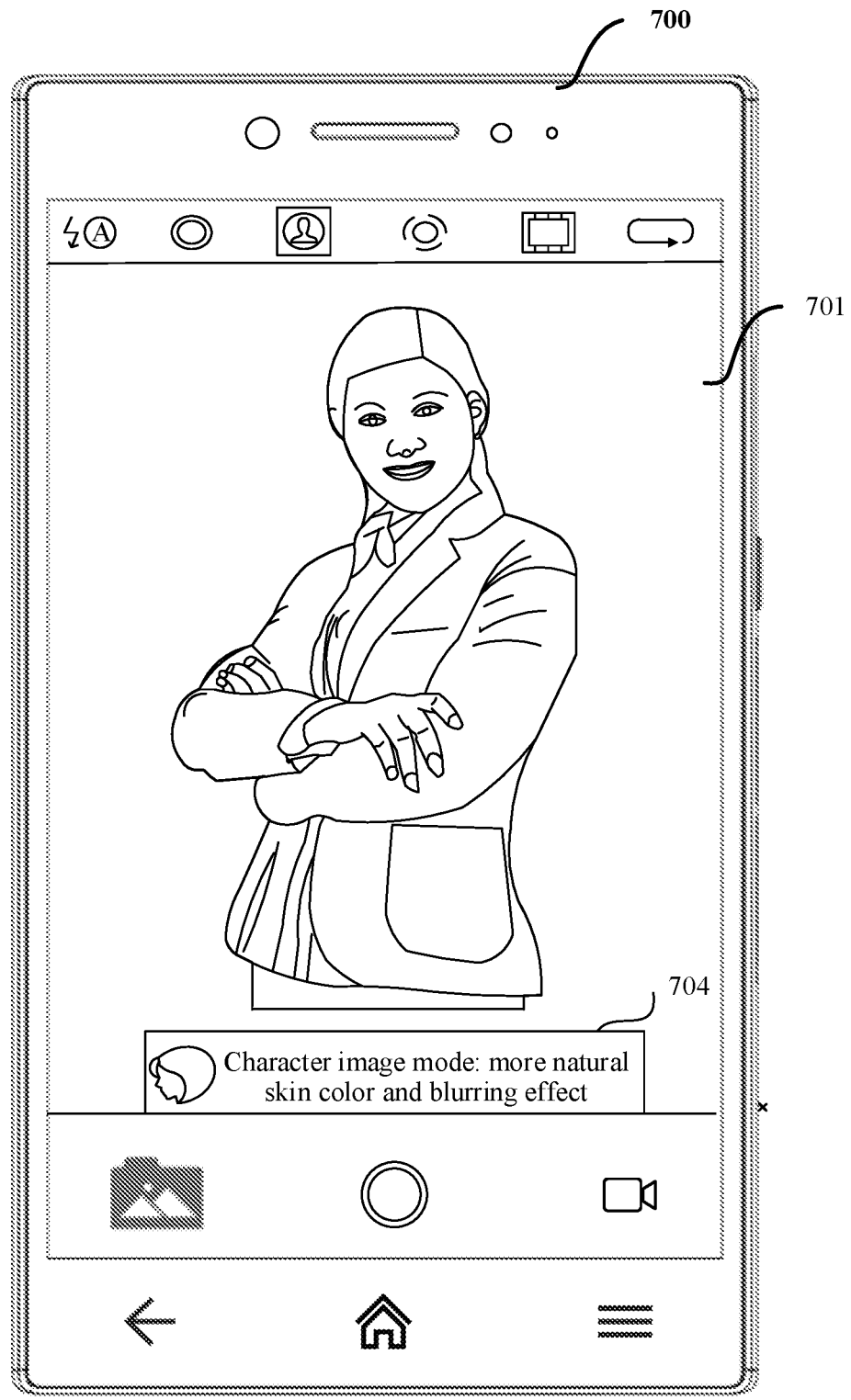
FIG. 7C is a schematic diagram of a display status of a display screen when a terminal device photographs an image according to an embodiment of the present invention.

After the mobile phone 700 displays the icon 702 in the preview interface 701, if the user wants to know the recommended photographing mode, the user may trigger the icon 702 by performing a specific trigger operation, to open detailed information of the recommended photographing mode. Refer to FIG. 7C.

In FIG. 7C, when the user taps the icon 702, the mobile phone 700 opens an introduction card 704 of the character image photographing mode, so that the user knows details of the photographing mode recommended by the mobile phone 700. This can help the user determine whether to use the recommended photographing mode. The user may close the introduction card 704 by using a close control in the introduction card, or the user may close the introduction card 704 by touching any location in the preview interface. After the introduction card 704 is closed, the mobile phone 700 may still display the icon 702. If the user wants to use the recommended photographing mode, the user may trigger the icon 702 by performing another trigger operation. For example, the user may double-tap the icon 702, and then the mobile phone 700 enables the character image mode.

For an example, referring to FIG. 7B, because the user selects the recommended character image mode, the mobile phone 700 may highlight the icon 702 of the character image mode in the preview interface. The user may determine, by viewing whether the icon 702 is highlighted, whether the character image mode is successfully entered.

Figure 7D:
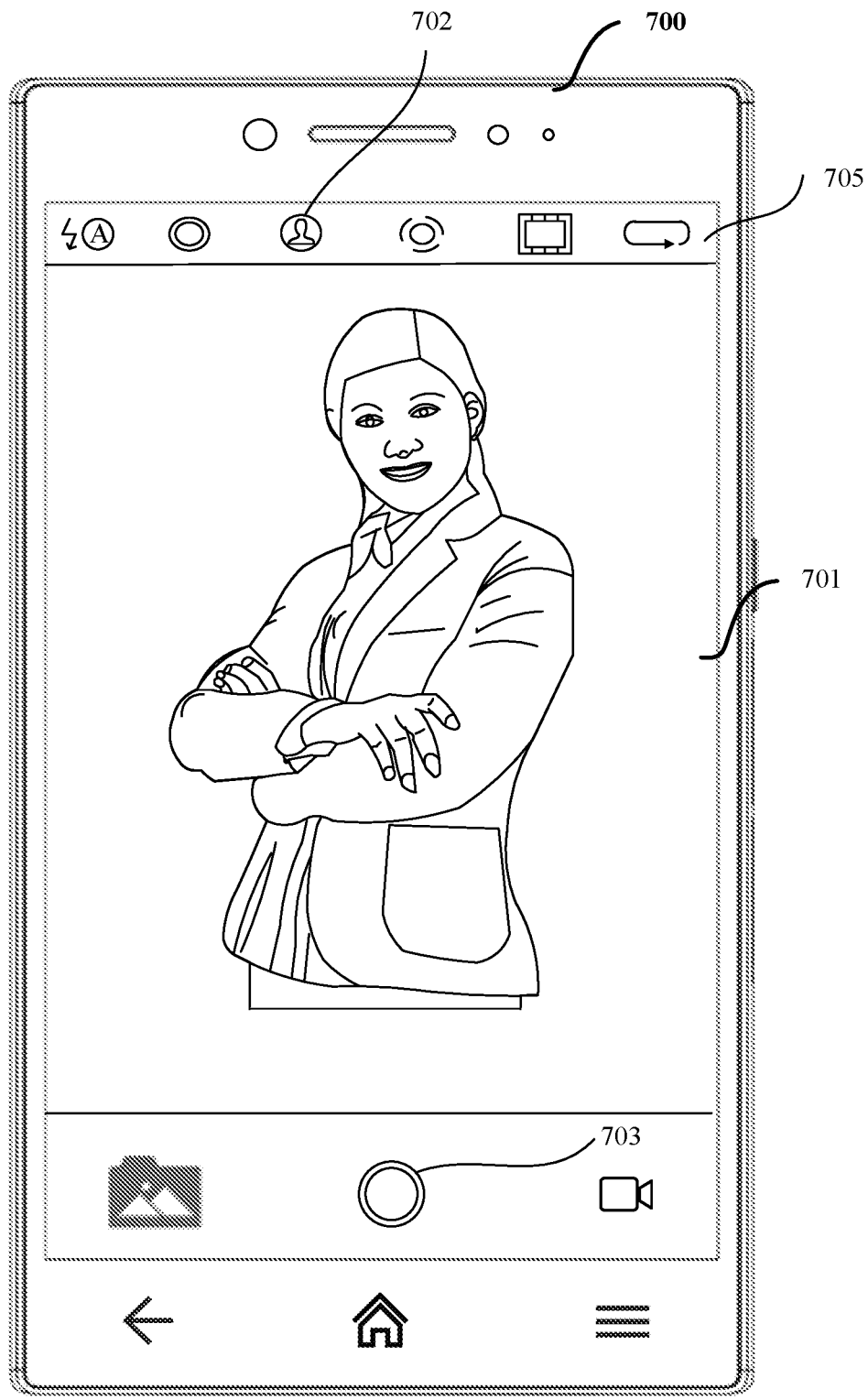
FIG. 7D is a schematic diagram of a display status of a display screen when a terminal device photographs an image according to an embodiment of the present invention.

For another example, refer to FIG. 7D. To avoid shielding the preview interface, after the user selects the recommended character image mode, the mobile phone 700 may hide the icon 702 in the preview interface 701, and display the highlighted icon 702 of the character image mode in an icon display bar 705.

Figure 7E:
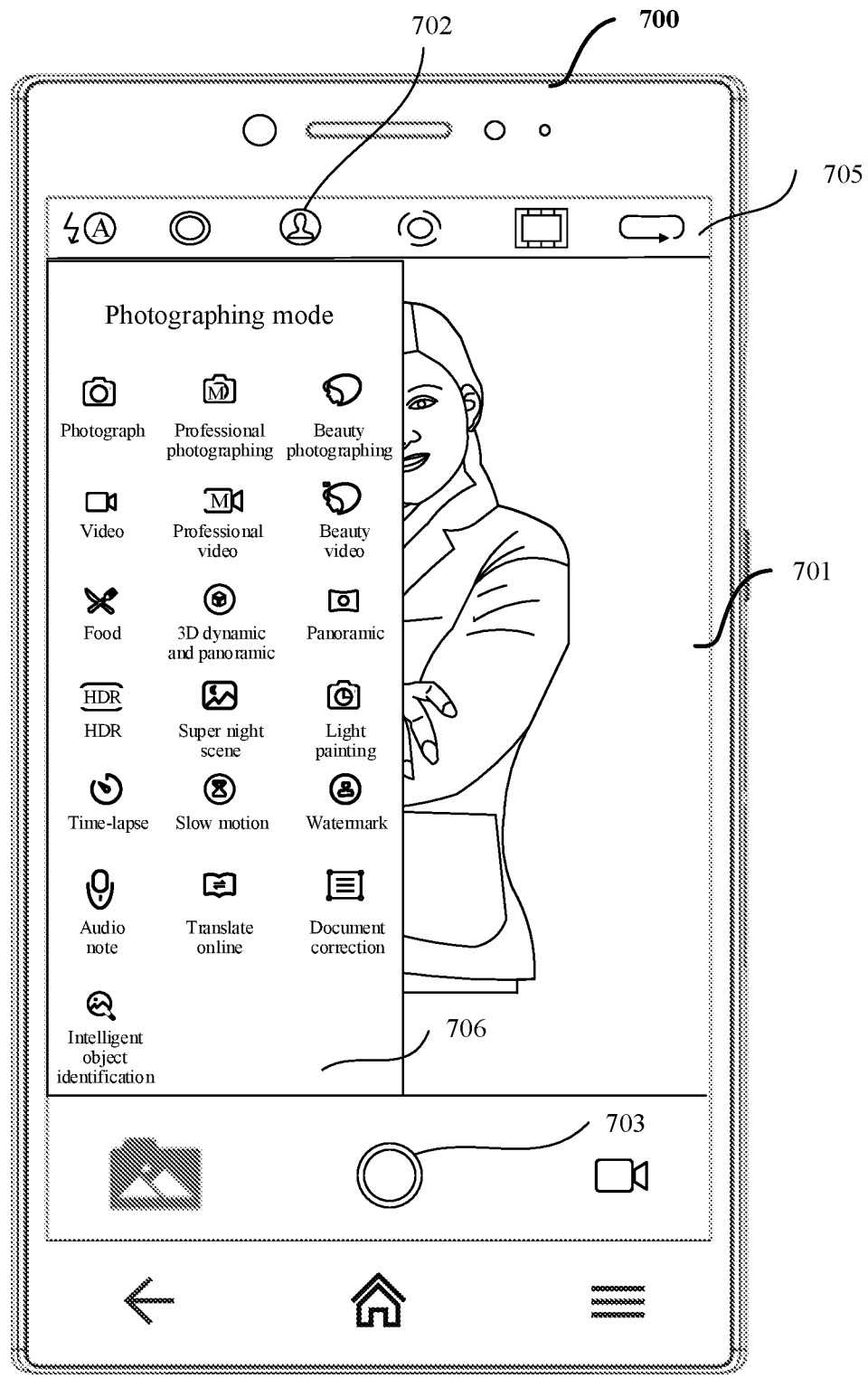
FIG. 7E is a schematic diagram of a display status of a display screen when a terminal device photographs an image according to an embodiment of the present invention.

If the user does not want to use the recommended character image mode, but wants to try another mode, the user may select a control by triggering a specific photographing mode, or a finger of the user or a stylus slides to the right at any location in the preview interface 701, and the mobile phone 700 displays a photographing mode selection interface 706 in the preview interface 701. Refer to FIG. 7E.

In FIG. 7E, the photographing mode selection interface 706 is displayed in the preview interface 701 of the mobile phone 700. The user may select a desired photographing mode from the photographing mode selection interface 706.

Figure 7F:
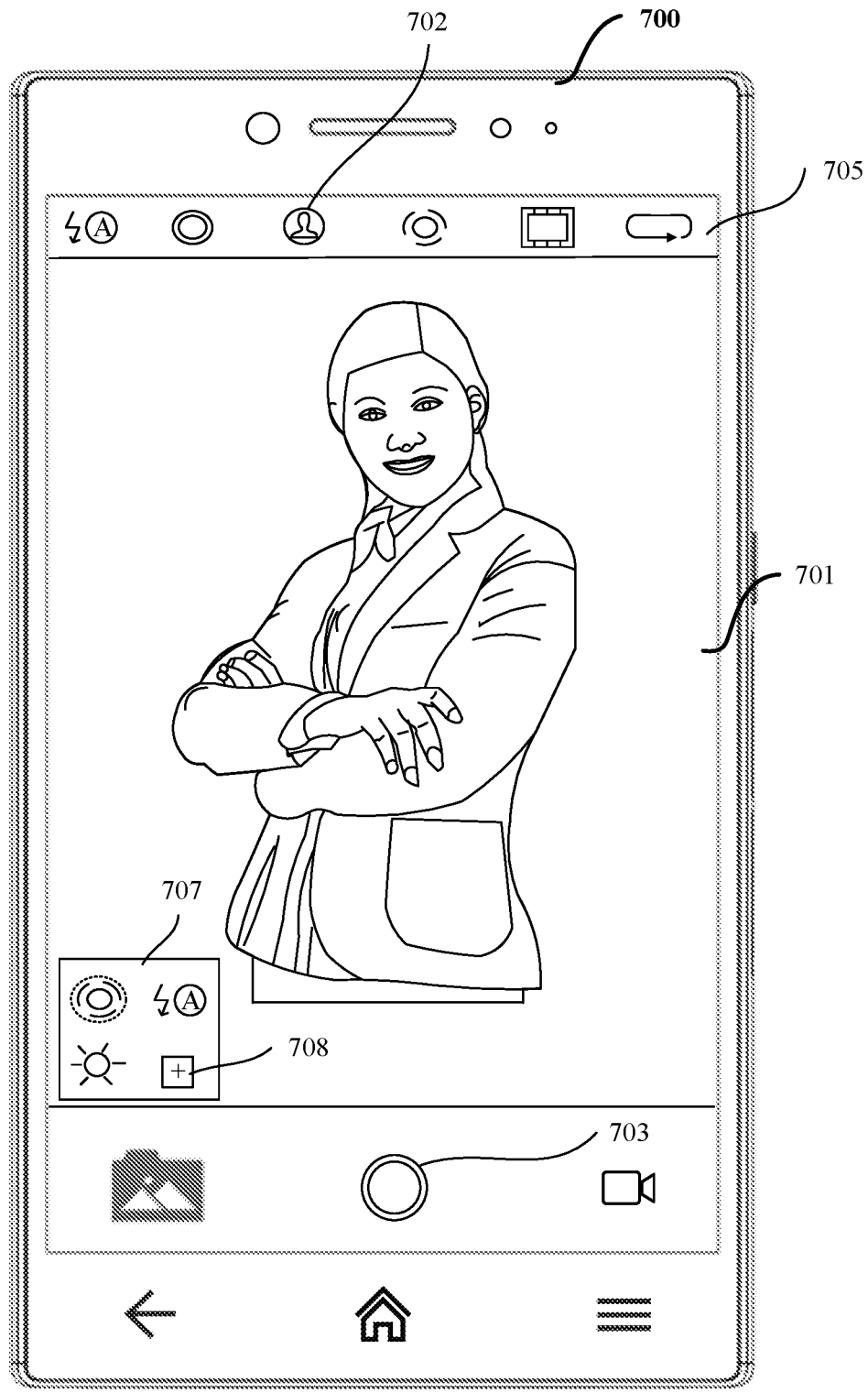
FIG. 7F is a schematic diagram of a display status of a display screen when a terminal device photographs an image according to an embodiment of the present invention.

It can be learned from the foregoing content that the photographing mode may be understood as a set of parameters that are set when the mobile phone photographs an image. After entering the recommended photographing mode, the mobile phone 700 may further display parameters related to the photographing mode. As shown in FIG. 7F, the mobile phone 700 displays a display window 707, and the display window 707 displays parameters corresponding to a photographing mode currently used by the mobile phone 700. In FIG. 7F, an aperture and brightness are used as examples. In addition, the display window 707 further includes an add control 708. In a possible implementation, the user may trigger the add control 708 to display icons of all parameters related to photographing in the mobile phone 700, and the user may select icons of several parameters from the icons of all the parameters and add them to the display window 707. Once a parameter is added to the display window 707, the mobile phone 700 loads the parameter. In other words, the mobile phone 700 considers that the user adjusts a set of parameters in the photographing mode, for example, adds or removes a parameter.

For example, the user may further tap an icon of a parameter in the display window 707, and then the mobile phone 700 displays an input box, where a value of the parameter is displayed in the input box, and the user may modify the value, for example, increase or decrease the value. After the user modifies the value, the mobile phone 700 saves the value obtained after the modification of the user, and loads the parameter by using the modified value.

Certainly, when the mobile phone 700 detects that a quantity of times the user modifies a value of a parameter in a same photographing mode is greater than a preset quantity of times, the mobile phone 700 saves the parameter value obtained after the modification of the user. When this photographing mode is used next time, the parameter is automatically loaded by using the modified value.

Various implementations of this application may be randomly combined to achieve different technical effects.

In the embodiments provided in this application, the method provided in the embodiments of this application is described from a perspective in which the terminal device is used as an execution body. To implement functions in the method provided in the embodiments of this application, the terminal device may include a hardware structure and/or a software module, and implement the functions in a form of the hardware structure, the software module, or a combination of the hardware structure and the software module. Whether a specific function in the functions is performed by using the hardware structure, the software module, or the combination of the hardware structure and the software module depends on a specific application and a design constraint of the technical solution.

Figure 8:
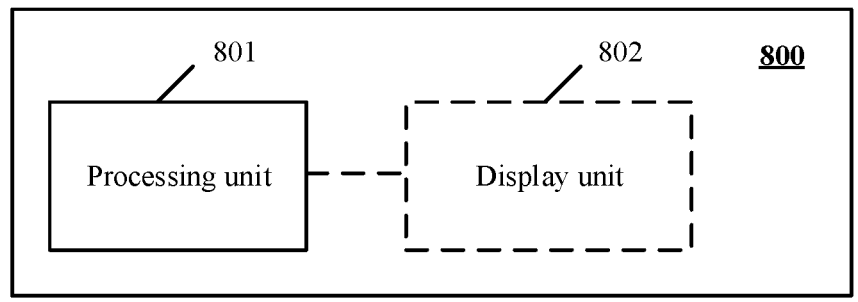
FIG. 8 is a schematic structural diagram of a terminal device according to an embodiment of the present invention.

Based on a same concept, FIG. 8 shows a terminal device 800 according to this application. The terminal device 800 may be a terminal device having an image photographing capability. As shown in FIG. 8, the terminal device 800 includes a processing unit 801 and a display unit 802.

The processing unit 801 is configured to start a lens in the terminal device 800.

The display unit 802 is configured to display a preview interface, where the preview interface includes a to-be-photographed object.

The display unit is further configured to display first prompt information of a photographing mode if the processing unit 801 determines that the preview interface has been stably displayed for preset duration, where the first prompt information is used to recommend a first photographing mode to a user, and the first photographing mode is determined by the processing unit 801 based on scene information of the to-be-photographed object.

In one embodiment, after the preview interface has been stably displayed for the preset duration, the processing unit 801 is further configured to: identify at least one type of scene information included in the to-be-photographed object; when the to-be-photographed object includes one type of scene information, determine, based on the scene information and a first mapping relationship between scene information and a photographing mode, the first photographing mode corresponding to the scene information; or when the to-be-photographed object includes at least two types of scene information, determine, based on the scene information and a first mapping relationship between scene information and a photographing mode, a photographing mode corresponding to each of the at least two types of scene information, to obtain at least two photographing modes; and select the first photographing mode from the at least two photographing modes according to a priority policy, where the priority policy includes priorities of the at least two photographing modes.

In one embodiment, before the preview interface has been stably displayed for the preset duration, the processing unit 801 is further configured to: collect n frames of preview interfaces, where n is an integer greater than or equal to 1; identify at least one type of scene information of the to-be-photographed object included in each of the n frames of preview interfaces; and determine, based on the at least one type of scene information, a photographing mode matching each frame of preview interface. The display unit 802 is specifically configured to display the first prompt information in the preview interface, where the first prompt information is used to recommend the first photographing mode to the user, and the first photographing mode is a photographing mode matching the last frame of preview interface in the n frames of preview interfaces.

In one embodiment, when the processing unit 801 is configured to determine whether the preview interface has been stably displayed for the preset duration, the processing unit 801 is specifically configured to: collect at least two frames of preview interfaces within the preset duration; if a similarity between the at least two frames of preview interfaces is higher than a preset similarity, determine that the preview interface has been stably displayed for the preset duration; or detect, by using a motion sensor, whether the processing unit 801 is in a still state within the preset duration; and if the terminal device is in a still state within the preset duration, determine that the preview interface has been stably displayed for the preset duration.

In one embodiment, the first prompt information includes a first icon, the first icon is used to identify the first photographing mode, and the display unit is specifically configured to display the first icon in a first display region in the preview interface. The processing unit 801 loads, in response to a first operation on the first icon, a parameter corresponding to the first photographing mode.

In one embodiment, the display unit 802 is further configured to display the first parameter set in a second display region in the preview interface. The display unit 802 is further configured to display a modified second parameter set in response to a second operation, where the second parameter set is a parameter set obtained after a first parameter in the first parameter set is modified. The processing unit 801 is further configured to load the second parameter set.

In one embodiment, if the first parameter is modified more than a preset quantity of times, the processing unit 801 is further configured to establish a third mapping relationship between the second parameter set and the first photographing mode. The processing unit 801 is further configured to add the third mapping relationship to the second mapping relationship.

In one embodiment, the display unit 802 is further configured to display first information in the preview interface after the processing unit 801 responds to the second operation on the first icon, where the first information is text information describing the first photographing mode.

In one embodiment, the display unit 802 is further configured to display second prompt information in the preview interface, where the second prompt information is used to remind the user that the terminal device is currently in the first photographing mode.

In one embodiment, if the user selects another photographing mode other than the first photographing mode recommended by using the first prompt information, the processing unit 801 is further configured to: determine whether a quantity of times the user selects the another photographing mode exceeds a preset quantity of times; and when the quantity of times the user selects the another photographing mode exceeds the preset quantity of times, if there is only one type of scene information of the to-be-photographed scene, update the first mapping relationship by using a second mapping relationship between the another photographing mode and the scene information; or if there are at least two types of scene information of the to-be-photographed scene, set a first priority of the another photographing mode to a second priority, where the second priority is greater than the first priority. The terminal device updates the priority policy by using the second priority of the another photographing mode.

Figure 9:
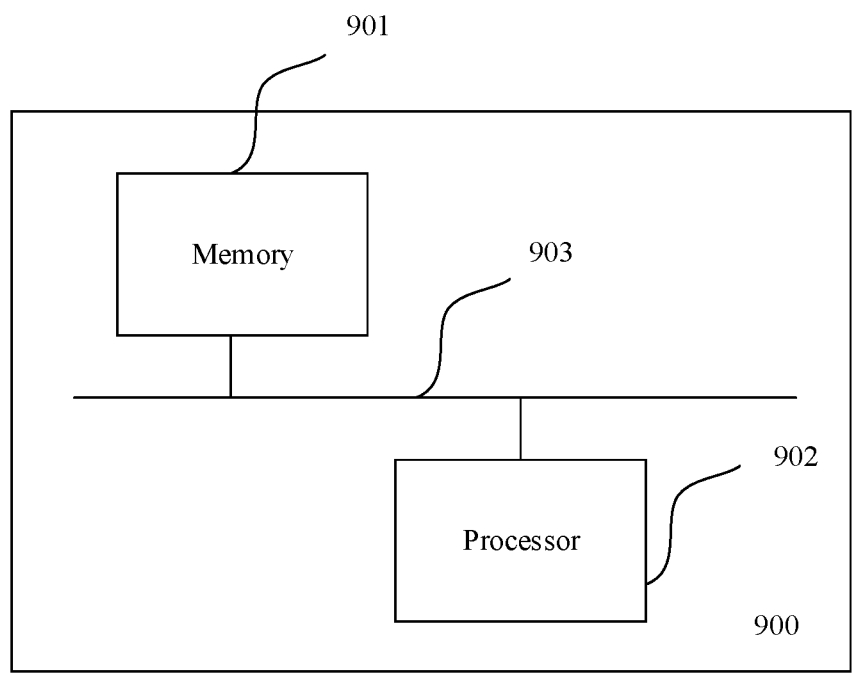
FIG. 9 is a schematic structural diagram of a terminal device according to an embodiment of the present invention.

In a simple embodiment, a person skilled in the art may figure out that the terminal device 800 is further implemented by using a structure shown in FIG. 9.

As shown in FIG. 9, the terminal device 900 includes a memory 901, a processor 902, and a bus 903. The memory 901 and the processor 902 are connected by using the bus 903. The memory 901 is configured to store a computer-executable instruction. When the terminal device 900 runs, the processor 902 executes the computer-executable instruction stored in the memory 901, so that the terminal device 900 implements the intelligent assistant control method provided in the embodiment shown in FIG. 2 or FIG. 5. For a specific intelligent assistant control method, refer to the foregoing descriptions and related descriptions in the accompanying drawings. For brevity of this specification, details are not described herein again.

With descriptions of the foregoing implementations, a person skilled in the art may clearly understand that the embodiments of this application may be implemented through hardware, firmware, or a combination thereof. When the software is used to implement the embodiments, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another place. The storage medium may be any available medium accessible to a computer. This is used as an example but is not limited to: The computer-readable medium may include a RAM, a ROM, an electrically erasable programmable read-only memory (EEPROM), a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server, or another remote source by using a coaxial cable, an optical fiber cable, a twisted pair, a digital subscriber line (DSL), or wireless technologies such as an infrared technology, a radio technology, and a microwave technology, the coaxial cable, the optical fiber cable, the twisted pair, the DSL, or the wireless technologies such as the infrared technology, the radio technology, and the microwave technology are included in fixation of a medium to which they belong. A disk and disc used in the embodiments of this application include a compact disc (CD), a laser disc, an optical disc, a digital video disc (DVD), a floppy disk, and a Blu-ray disc. The disk generally reproduces data magnetically, and the disc reproduces data optically by using laser. The foregoing combination should also fall within the protection scope of the computer-readable medium.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of intelligent assistant control, wherein the method comprises:
   starting, by a terminal device, a lens;
   displaying, by the terminal device, a preview interface on a display screen, wherein the preview interface comprises a to-be-photographed object;
   identifying, by the terminal device, at least two types of scene information comprised in the to-be-photographed object;
   determining a first photographing mode from at least two photographing modes according to a priority policy and a first mapping relationship between the at least two types of scene information and the at least two photographing modes, wherein the priority policy comprises priorities of the at least two photographing modes, wherein the priorities of the at least two photographing modes are based on a quantity of times that each of the at least two photographing modes has been used by the terminal device; and
   displaying, by the terminal device, a first prompt information of the first photographing mode in the preview interface when the terminal device determines that the to-be-photographed object in the preview interface has been stably displayed for preset duration, wherein the terminal device recommends the first photographing mode to a user based on the first prompt information.

2. The method according to claim 1, wherein the identifying of the at least two types of scene information comprised in the to-be-photographed object and the determining of the first photographing mode according to the priority policy and the first mapping relationship between the at least two types of scene information and the photographing modes comprises:
   collecting, by the terminal device, n frames of the preview interface, wherein n is an integer greater than or equal to 1;
   identifying, by the terminal device, the at least two types of scene information of the to-be-photographed object comprised in each of the n frames of the preview interface; and
   determining, by the terminal device based on the at least two types of scene information, a photographing mode matching each frame of the preview interface; and
   determining the first photographing mode as a photographing mode matching a last frame of the preview interface in the n frames of the preview interface.

3. The method according to claim 1, wherein the terminal device determines the preset duration in which the to-be-photographed object in the preview interface has been stably displayed comprises:
   collecting, by the terminal device, at least two frames of the preview interface within the preset duration;
   when a similarity between the at least two frames of the preview interface is higher than a preset similarity, determining that the to-be-photographed object in the preview interface has been stably displayed for the preset duration; or
   detecting, by the terminal device by using a motion sensor, whether the terminal device is in a still state within the preset duration; and
   when the terminal device is in a still state within the preset duration, determining that the to-be-photographed object in the preview interface has been stably displayed for the preset duration.

4. The method according to claim 1, wherein the first prompt information comprises a first icon, the first icon identifies the first photographing mode, and the displaying, by the terminal device, of the first prompt information comprises:
   displaying, by the terminal device, the first icon in a first display region in the preview interface, wherein the terminal device loads, in response to a first operation on the first icon, a first parameter set corresponding to the first photographing mode based on a second mapping relationship between the first photographing mode and the first parameter set.

5. The method according to claim 4, wherein the method further comprises:
   displaying, by the terminal device, the first parameter set in a second display region in the preview interface;
   displaying, by the terminal device, a modified second parameter set in response to a second operation, wherein the modified second parameter set is obtained after a first parameter in the first parameter set is modified; and
   loading, by the terminal device, the modified second parameter set.

6. The method according to claim 5, wherein the method further comprises:
   when the first parameter is modified more than a preset quantity of times, establishing, by the terminal device, a third mapping relationship between the modified second parameter set and the first photographing mode; and adding, by the terminal device, the third mapping relationship to the second mapping relationship.

7. The method according to claim 4, wherein the method further comprises:

displaying, by the terminal device, a first information in the preview interface in response to a second operation on the first icon, wherein the first information is text information describing the first photographing mode.

8. The method according to claim 4, wherein the method further comprises:

displaying, by the terminal device, second prompt information in the preview interface, wherein the second prompt information is used to remind the user that the terminal device is currently in the first photographing mode.

9. The method according to claim 1, wherein when the user selects another photographing mode other than the first photographing mode recommended by the terminal device, the method further comprises:

determining, by the terminal device, whether a quantity of times the user selects the another photographing mode exceeds a preset quantity of times; and when the quantity of times the user selects the another photographing mode exceeds the preset quantity of times, setting, by the terminal device, a first priority of the another photographing mode to a second priority, wherein the second priority is greater than the first priority; and updating, by the terminal device, the priority policy by using the second priority of the another photographing mode.

10. A terminal device, comprising:
a processor;
a lens;
a display screen; and
a memory;
wherein the processor executes instructions stored in the memory to perform operations comprising:
starting the lens;
instructing the display screen to display a preview interface that comprises a to-be-photographed object;
identifying at least two types of scene information comprised in the to-be-photographed object;
determining a first photographing mode from at least two photographing modes according to a priority policy and a first mapping relationship between the at least two types of scene information and the at least two photographing modes, wherein the priority policy comprises priorities of the at least two photographing modes, wherein the priorities of the at least two photographing modes are based on a quantity of times that each of the at least two photographing modes has been used by the terminal device; and
instructing the display screen to display a first prompt information of the first photographing mode in the preview interface when determining the to-be-photographed object in the preview interface has been stably displayed for a preset duration, wherein the terminal device recommends the first photographing mode to a user based on the first prompt information.

11. A non-transitory computer readable storage medium, wherein the non-transitory computer readable storage medium comprises a computer program, and when the computer program is run on a terminal device, the terminal device is enabled to perform:

starting a lens;
displaying a preview interface on a display screen, wherein the preview interface comprises a to-be-photographed object;
identifying at least two types of scene information comprised in the to-be-photographed object;
determining a first photographing mode from at least two photographing modes according to a priority policy and a first mapping relationship between the at least two types of scene information and the at least two photographing modes, wherein the priority policy comprises priorities of the at least two photographing modes, wherein the priorities of the at least two photographing modes are based on a quantity of times that each of the at least two photographing modes has been used by the terminal device; and
displaying a first prompt information of the first photographing mode in the preview interface when the terminal device determines that the to-be-photographed object in the preview interface has been stably displayed for a preset duration, wherein the terminal device recommends the first photographing mode to a user based on the first prompt information.

12. The terminal device according to claim 10, wherein the identifying of the at least two types of scene information comprised in the to-be-photographed object and the determining of the first photographing mode according to the priority policy and the first mapping relationship between the at least two types of scene information and the photographing modes comprises:

collecting n frames of the preview interface, wherein n is an integer greater than or equal to 1;
identifying the at least two types of scene information of the to-be-photographed object comprised in each of the n frames of the preview interface; and
determining, based on the at least two types of scene information, a photographing mode matching each frame of the preview interface; and
determining the first photographing mode as a photographing mode matching a last frame of the preview interface in the n frames of the preview interface.

13. The terminal device according to claim 10, wherein the determining of the preset duration in which the to-be-photographed object in the preview interface has been stably displayed, comprises:

collecting at least two frames of the preview interface within the preset duration;
when a similarity between the at least two frames of the preview interface is higher than a preset similarity, determining that the to-be-photographed object in the preview interface has been stably displayed for the preset duration; or
detecting whether the terminal device is in a still state within the preset duration by using a motion sensor; and
when the terminal device is in a still state within the preset duration, determining that the to-be-photographed object in the preview interface has been stably displayed for the preset duration.

14. The terminal device according to claim 10, wherein the first prompt information comprises a first icon that identifies the first photographing mode, and the displaying of the first prompt information comprises:

displaying the first icon in a first display region in the preview interface, wherein the terminal device loads, in response to a first operation on the first icon, a first parameter set corresponding to the first photographing mode based on a second mapping relationship between the first photographing mode and the first parameter set.

15. The terminal device according to claim 14, the operations further comprising:
    instructing the display screen to display a first parameter set in a second display region in the preview interface;
    instructing the display screen to display a modified second parameter set in response to a second operation, wherein the modified second parameter set is obtained after a first parameter in the first parameter set is modified; and
    loading the modified second parameter set.

16. The method terminal device according to claim 15, the operations further comprising:
    when the first parameter is modified more than a preset quantity of times, establishing a third mapping relationship between the modified second parameter set and the first photographing mode; and
    adding the third mapping relationship to the second mapping relationship.

17. The terminal device according to claim 15, the operations further comprising:
    instructing the display screen to display a second prompt information in the preview interface, wherein the second prompt information is used to remind the user that the terminal device is currently in the first photographing mode.

18. The terminal device according to claim 15, the operations further comprising:
    when the user selects another photographing mode other than the first photographing mode recommended by the terminal device, determining whether a quantity of times that the user selects the another photographing mode exceeds a preset quantity of times; and
    when the quantity of times that the user selects the another photographing mode exceeds the preset quantity of times, setting a first priority of the another photographing mode to a second priority, wherein the second priority is greater than the first priority; and
    updating the priority policy by using the second priority of the another photographing mode.

19. The non-transitory computer readable storage medium according to claim 11, wherein the identifying of the at least two types of scene information comprised in the to-be-photographed object and the determining of the first photographing mode according to the priority policy and the first mapping relationship between the two least two types of scene information and the at least two photographing modes comprises:
    collecting n frames of the preview interface, wherein n is an integer greater than or equal to 1;
    identifying the at least two types of scene information of the to-be-photographed object comprised in each of the n frames of preview interfaces; and
    determining based on the at least two types of scene information, a photographing mode matching each frame of the preview interface; and
    determining the first photographing mode as a photographing mode matching a last frame of the preview interface in the n frames of preview interfaces.

20. The non-transitory computer readable storage medium according to claim 11, wherein determining the preset duration in which the to-be-photographed object in the preview interface has been stably displayed comprises:
    collecting at least two frames of the preview interface within the preset duration;
    when a similarity between the at least two frames of the preview interface is higher than a preset similarity, determining that the to-be-photographed object in the preview interface has been stably displayed for the preset duration; or
    detecting whether the terminal device is in a still state within the preset duration by using a motion sensor; and
    when the terminal device is in a still state within the preset duration, determining that the to-be-photographed object in the preview interface has been stably displayed for the preset duration.

* * * * *